US011551550B2

(12) United States Patent
Eastling et al.

(10) Patent No.: US 11,551,550 B2
(45) Date of Patent: Jan. 10, 2023

(54) TRACK INFORMATION SYSTEM

(71) Applicant: East Coast Racing Technologies, Inc., Winston-Salem, NC (US)

(72) Inventors: Matthew Blaine Eastling, Winston-Salem, NC (US); Glenn Alan Stephens, Alpharetta, GA (US); Andre Phillipe Surles, Charlottesville, VA (US); Joseph Wayne Vinson, Flowery Branch, GA (US)

(73) Assignee: EAST COAST RACING TECHNOLOGIES, LLC, Winston-Salem, NC (US)

( * ) Notice: Subject to any disclaimer, the term of this patent is extended or adjusted under 35 U.S.C. 154(b) by 129 days.

(21) Appl. No.: 17/124,289

(22) Filed: Dec. 16, 2020

(65) Prior Publication Data

US 2021/0104157 A1   Apr. 8, 2021

Related U.S. Application Data

(63) Continuation of application No. 16/175,728, filed on Oct. 30, 2018, now Pat. No. 10,885,782.
(Continued)

(51) Int. Cl.
*G08G 1/0967* (2006.01)
*G08G 1/01* (2006.01)
(Continued)

(52) U.S. Cl.
CPC .......... *G08G 1/096775* (2013.01); *A63K 1/00* (2013.01); *A63K 3/00* (2013.01);
(Continued)

(58) Field of Classification Search
CPC .......... G08G 1/096775; G08G 1/0112; G08G 1/0116; G08G 1/0141; H04W 4/44;
(Continued)

(56) References Cited

U.S. PATENT DOCUMENTS

| 4,999,604 A | * | 3/1991 | Crews ...................... G07C 1/24 340/988 |
| 6,380,911 B1 | | 4/2002 | Eaton |

(Continued)

FOREIGN PATENT DOCUMENTS

| WO | 2015/140271 A1 | 9/2015 |
| WO | 2016/016160 A2 | 2/2016 |
| WO | 2016/016163 A1 | 2/2016 |
| WO | 2016/059041 A1 | 4/2016 |
| WO | 2016/097215 A1 | 6/2016 |

OTHER PUBLICATIONS https://web.archive.org/web/20160829231750/http://myroadtrip.net/2015-pro-marshals-handbook/series/ (Year: 2016).*

*Primary Examiner* — Aaron L Troost
(74) *Attorney, Agent, or Firm* — Dinsmore & Shohl LLP

(57) ABSTRACT

Methods for providing track condition information include receiving, at a first mobile track control station, a track condition notification. Such methods further include transmitting, from the first mobile track control station to a second mobile track control station in a network of mobile track control stations, the track condition notification. Such methods further include receiving, at the first mobile track control station from a third mobile track control station, affected track sector data regarding an affected track sector. Such methods further include transmitting, from the first mobile track control station to a first mobile track information station within a first vehicle, the affected track sector data, wherein the affected track sector data is configured to be used by the first mobile track information station to determine whether the first vehicle is within the affected track sector.

20 Claims, 7 Drawing Sheets

Related U.S. Application Data

(60) Provisional application No. 62/579,788, filed on Oct. 31, 2017.

(51) Int. Cl.
  *H04W 4/44* (2018.01)
  *H04W 4/021* (2018.01)
  *H04W 4/02* (2018.01)
  *A63K 1/00* (2006.01)
  *A63K 3/00* (2006.01)
  *H04W 4/029* (2018.01)
  *H04W 4/90* (2018.01)

(52) U.S. Cl.
  CPC ......... *G08G 1/0112* (2013.01); *G08G 1/0116* (2013.01); *G08G 1/0141* (2013.01); *H04W 4/022* (2013.01); *H04W 4/025* (2013.01); *H04W 4/44* (2018.02); *H04W 4/026* (2013.01); *H04W 4/027* (2013.01); *H04W 4/029* (2018.02); *H04W 4/90* (2018.02)

(58) Field of Classification Search
  CPC ..... H04W 4/022; H04W 4/025; H04W 4/029; H04W 4/90; H04W 4/026; H04W 4/027; A63K 1/00; A63K 3/00
  See application file for complete search history.

(56) References Cited

U.S. PATENT DOCUMENTS

| | | |
|---|---|---|
| 8,952,830 B2 | 2/2015 | Sims et al. |
| 9,460,564 B2 | 10/2016 | Six et al. |
| 2001/0029613 A1 | 10/2001 | Fernandez et al. |
| 2002/0090217 A1 | 7/2002 | Limor et al. |
| 2003/0190953 A1 | 10/2003 | DeWeese et al. |
| 2004/0135677 A1 | 7/2004 | Asam |
| 2008/0036587 A1 | 2/2008 | Meinzen et al. |
| 2008/0186166 A1 | 8/2008 | Zhou et al. |
| 2008/0259096 A1 | 10/2008 | Huston |
| 2011/0181443 A1 | 7/2011 | Gutierrez et al. |
| 2013/0124084 A1 | 5/2013 | Seo |
| 2013/0130801 A1 | 5/2013 | Haswell et al. |
| 2013/0141251 A1 | 6/2013 | Sims et al. |
| 2015/0057964 A1 | 2/2015 | Albinali |
| 2015/0249778 A1 | 9/2015 | Taylor et al. |
| 2016/0225410 A1 | 8/2016 | Lee et al. |
| 2016/0259952 A1 | 9/2016 | Van Rens et al. |
| 2016/0275730 A1 | 9/2016 | Bonhomme |
| 2016/0308578 A1 | 10/2016 | Six et al. |
| 2017/0134511 A1 | 5/2017 | White et al. |
| 2017/0161962 A1 | 6/2017 | Harvey et al. |
| 2017/0206367 A1 | 7/2017 | Six et al. |
| 2017/0222828 A1 | 8/2017 | Six et al. |
| 2020/0280827 A1 | 9/2020 | Fechtel et al. |

* cited by examiner

TRACK INFORMATION SYSTEM

CROSS-REFERENCE TO RELATED APPLICATIONS

This application is a continuation of U.S. patent application Ser. No. 16/175,728, filed on Oct. 30, 2018, which claims the benefit of and priority to U.S. Provisional Patent Application No. 62/579,788, filed on Oct. 31, 2017, the contents of each of which are incorporated herein by reference in their entirety.

INTRODUCTION

Aspects of the present disclosure relate to a track information system.

A critical capability at a track, such as a paved racetrack, dirt racetrack, rally track, autocross track, race course, or the like, is the ability to communicate track condition or status information to drivers and other personnel on and around the track. Historically, this has been accomplished with human "flaggers" strategically placed at various locations around the track. Each flagger generally has a selection of flags of different colors and patterns that can be waved at drivers to communicate track conditions. For example, the well-known yellow flag for caution, or checkered flag for race finish.

While manual flagging by personnel around the track is simple and relatively effective, it is nevertheless reliant on assumptions that are not always true. First, a human flagger must actually see and correctly assess a condition on the track and thereafter decide to waive an appropriate flag and/or communicate with a track or race controller (e.g., via radio). Second, once a flagger is waiving a flag, it is incumbent on each individual driver to look for, acknowledge, and abide by the waived flag. Human error on the part of both the flagger and driver are commonplace. For example, a flagger may not see a dangerous condition on the track and thereafter not warn approaching drivers, or a driver may not see a flag regarding the dangerous condition and thereafter driving unsafely into a portion of the track. Further, despite best efforts, manual flagging may be ineffective due to conditions beyond anyone's control, such as bad weather conditions (e.g., rain and fog), or dense smoke from a fire, lack of ambient light, or the like.

Digital flagging technologies, such as those deployed in professional race series (e.g., Formula One), are available, but they are expensive and require significant proprietary hardware and software, making them impractical for use in most situations. For example, it is not possible to design simple and cost effective in-car devices to be used with such systems as those systems require extremely complex and proprietary hardware and software. Such solutions are beyond the technical and economic requirements of many professional, semi-professional, and hobbyist race events.

Accordingly, what is needed is a versatile, but cost effective, track information system that provides track staff with better functionality and that provides drivers with salient and easily recognizable information.

BRIEF SUMMARY

In one aspect, a method for providing track condition information includes: receiving, at a first mobile track control station, a track condition notification; transmitting, from the first mobile track control station to a second mobile track control station in a network of mobile track control stations, the track condition notification; receiving, at the first mobile track control station from a third mobile track control station, affected track sector data regarding an affected track sector; and transmitting, from the first mobile track control station to a first mobile track information station within a first vehicle, the affected track sector data, wherein the affected track sector data is configured to be used by the first mobile track information station to determine whether the first vehicle is within the affected track sector.

In a second aspect, a method for providing track condition information, includes: receiving, at a mobile track information station from a mobile track control station, affected track sector data; and determining, by the mobile track information station, based on the affected track sector data, to display a track condition notification on a display of the mobile track information station, wherein the affected track sector data comprises: track sector limit data; and a track sector entry heading range.

In alternative embodiments, an electronic device may be configured to perform the aforementioned methods. In further embodiments, a non-transitory computer-readable medium may comprise instructions configured to cause an electronic device to perform the aforementioned methods.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
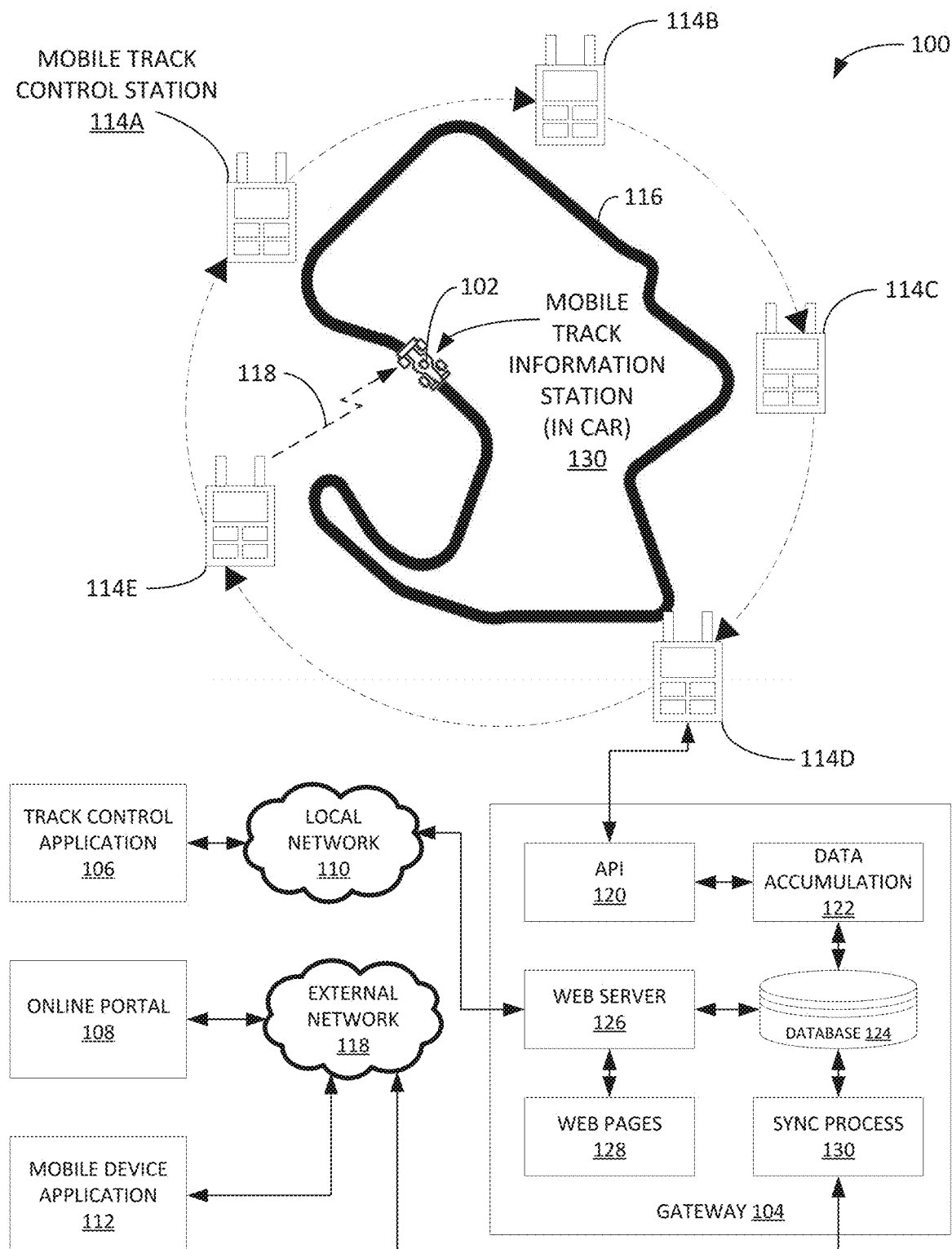
FIG. 1 depicts an example of a track information system.

Aspects of the present disclosure provide apparatuses, methods, processing systems, and computer readable mediums for providing a track information system.

A track information system as described herein may include several interoperable components. For example, the track information system may include a track control application configured to monitor and control the flags throughout the track (e.g., used in a control tower at a track). In some implementations, the track control application may allow configuration of track specific data by track personnel and sanctioning bodies, such as track layout, track direction, track timing, and the like. In some examples, the track control application may also record and provide an archive of track incidents. In some implementations, the track control application is a web-based application.

The track information system may also include a gateway configured to enable data exchange between various track information devices and the track control application. In some implementations, the gateway hosts a user interface for the track control application, for example, by way of a web server hosting track control application pages that are accessible via a local network.

The track information system may also include mobile track control stations configured to set (e.g., trigger and clear) local track conditions, which may traditionally be represented by different flags, or to receive track condition information from the track control application (such as a global track condition like a red or checkered flag). Further, in some implementations, each mobile track control station serves as a repeater using a wireless track information protocol to transmit data between mobile track control stations and to a gateway.

The track information system may also include mobile track information stations configured to display track information provided by the track information system. For example, the mobile track information stations may display a flag or other track condition notification (or "alert" or "indication") to a driver within a vehicle when the mobile track information station enters (or while transiting within) a particular zone or sector of a track. In some implementations, the mobile track information stations only display relevant track condition information based on the location of the vehicle in which the mobile track information station is located. Further, in some implementations, the mobile track information station may be used by drivers on a track (and other personnel) to report on-track incidents, or may do so automatically based on on-board sensor data (e.g., if a stopped or crashed vehicle is detected).

The track information system may also include a mobile application configured to handle authorization and subscription services such that a user may interact with the track information system.

The aforementioned elements of the track information system are just some examples, and other elements and capabilities are possible as are described further herein and as would be apparent to one of skill in the art.

Example Track Information System

FIG. 1 depicts an example of a track information system 100. Track information system 100 includes a plurality of mobile track control stations 114A-E deployed to various control stations around track 116 (e.g., to flag stations, observations stations, control towers, or the like—not depicted in FIG. 1).

Mobile track control stations 114A-E may be used by personnel to provide track control information to track control application 106 as well as to vehicles on track 116, such as vehicle 102. An example of a mobile track control station is described in more detail below with respect to FIGS. 2A and 2B.

Mobile track control stations 114A-E may be used by track or event personnel, such as corner workers, flaggers, spotters, controllers, or any other safety personnel, to trigger track condition or status notifications (e.g., alerts) about observed conditions. Because the mobile track control stations may require only a single button press to trigger the track condition notification, it leaves the personnel free for other important safety tasks, such as providing driver assistance or communicating with other track personnel. The track condition notification triggered transmitted by the mobile track control station is quickly relayed through the other mobile track control stations through a network, such as an ad-hoc ring or mesh network as depicted in FIG. 1, and then onto the track control application where appropriate decisions can be made regarding the condition of the track.

For example, a track condition notification regarding a broken down vehicle may be transmitted from mobile track control station 114E to mobile track control station 114A, then to mobile track control station 114B, then to mobile track control station 114C, then to mobile track control station 114D via the network formed between all mobile track control stations 114A-E. Mobile track control station 114D may then transmit the track condition notification to track control application 106 via gateway 104 and local network 110 (e.g., a local Wi-Fi network).

In some implementations, each mobile track control station may be assigned a node number (e.g., node 1 for track control station 114A, node 2 for track control station 114B, and so on). Further, a particular mobile track control station may be assigned as a master mobile track control station that transmits data to gateway 104 (including from any other networked mobile track control station) and receives data from gateway 104, which may thereafter be distributed to each other mobile track control station in track information system 100. In this example, mobile track control station 114D is the master mobile track control station, which facilitates information exchange between mobile track control stations 114A-E and gateway 104. In other implementations, a different mobile track control station (from the group of mobile track control stations 114A-E) may be assigned as the master mobile track control station as each of mobile track control stations 114A-E may be configured to act as the master mobile track control station. In some implementations, a master mobile track control station is referred to as node 0 in the mesh or ring network formed by mobile track control stations 114A-E.

Mobile track control stations 114A-E may communicate amongst themselves and with gateway 104 via, for example, a ring-type or mesh-type communication network. In some implementations, the ring-type or mesh-type communication network uses spread spectrum radio technology and time-slicing for message transmission priority. For example, the communication network set up by mobile track controls stations 114A-E may rely on time division multiple access (TDMA)-type configurations to ensure that each mobile track control station has an opportunity to transmit and receive data without interference. In such arrangements, each mobile track control station's unique ID may be associated with one or more transmit and receive slots for mobile track control station network communications. As discussed in more detail below, each mobile track control station may comprise a second "listen-only" radio for receiving track condition or vehicle condition notifications from a driver or vehicle at any time (i.e., not only within a designated time slot).

When configured as a ring network, each mobile track control station (i.e., node) in the mobile track control station network connects to two other mobile track control stations (e.g. a receive from and transmit to mobile track controls station), forming a single continuous pathway for information flow through each mobile track control station. Thus, data, such as track condition and vehicle condition information, travels from mobile track control station to mobile track control station (i.e., from node to node), with each mobile track control station along the way handling every data packet.

In some implementations, a ring-type mobile track control station network may be unidirectional, with all traffic travelling either clockwise or anticlockwise around the ring. However, in other embodiments, the ring-type mobile track control station network may be bidirectional to avoid disruption by the failure of a single link. In such configurations, the mobile track control station network may include a counter-rotating ring to form a redundant topology. Thus, in the event of a break, data transmissions are routed onto the counter-rotating ring before reaching the break, thereby maintaining a path to every mobile track control station in the mobile track control station network.

Notably, while depicted as a ring network in FIG. 1, mobile track control stations 114A-E may communicate amongst themselves and with gateway 104 in a mesh arrangement as well. In a mesh network, each mobile track control station may determine which other mobile track controls stations to listen to, and to transmit to, based on, for example, a mobile track control station ID (e.g., a node ID).

In some implementations, the flow of information between mobile track control stations 114A-E may be preconfigured, e.g., based on knowing where each mobile track control station will be located along a known track configuration. In such cases, the mobile track control station IDs may be mapped to each other to determine transmit to, receive from, and messaging order, among other configurations. In other implementations, the network of mobile track control stations 114A-E may be configured dynamically based on communications conditions, such as signal strength, propagation, noise, etc.

In some cases, mobile track control stations 114A-E use a custom track information protocol, which will be described in more detail below.

Mobile track control stations, such as 114E, may also transmit track condition information to and receive track or vehicle condition information from mobile track information stations, such as in vehicle 102 on track 116. An example of a mobile track information station is described in more detail below with respect to FIGS. 3A and 3B.

Track information system 100 also includes gateway 104. Gateway 104 acts as a data gathering and exchange gateway between mobile track control stations 114A-E and, for example, track control application 106, online portal 108, and/or mobile device application 112.

Gateway 104 includes one or more application programming interfaces (API 120) that are configured to allow data exchange between a mobile track control station (e.g., 114D) and gateway 104.

Gateway 104 also includes a data accumulation service 122, which acts to collect data inbound from the network of mobile race track control stations 114A-E by way of the master mobile track control station 114D. Data collected by data accumulation service 122 may be stored in a database, such as database 124, which itself may be a relational or non-relational database or any other sort of data repository capable of storing and sharing data with other elements of track information system 100. Further, as discussed in more detail below with respect to FIG. 5, database 124 may store track sector or zone limits, which are used for determining whether a track condition notification is relevant to a particular mobile track information station (e.g., 130). In some implementations, database 124 is an encrypted database.

Gateway 104 also includes sync process 130, which accesses data in database 124 and shares it with remote resources via external network 118 (e.g., the Internet), such as with online portal 108 and mobile device application 112.

Gateway 104 also includes web server 126, which serves up web pages for track control application 106. In this example, gateway 104 and track control application 106 may communicate via a local network connection, such as a local Wi-Fi connection, a local wired connection, a local point-to-point connection, or any other form of local network connection. In other examples, gateway 104 and track control application 106 may instead communicate via an external network, such as the Internet. In some implementations, gateway 104 hosts a private Wi-Fi network for use by track control application 106.

In some implementations, gateway 104 can operate without an external network (e.g., Internet) connection, though gateway 104 may need periodic connection to an external network (e.g., 118) in order to sync its database with other elements of track information system 100, such as online portal 108 and mobile device application 112.

Gateway 104 may be physically configured as a mobile device including transceivers, such as those necessary to setup a local data network (e.g., a local Wi-Fi network). In some cases, gateway 104 may be configured to act as a mobile track control station as well as a gateway.

Online portal 108 may serve to provide access to data collected by track information system 100 to users, such as drivers in an event hosted by a particular track, as well as racing organizations, track administrators, and the like. For example, racing organizations may use online portal 108 to register their personnel, configure tracks where they host races, and create special flags. Online portal 108 may also provide historical access to data from previous events and races. Further yet, online portal 108 may be used to create custom caution zones, which may be stored for later use.

Online portal 108 may further be used by individual users to register a mobile track information station and to enter payment information for subscription services as well as to request support for existing devices.

Online portal 108 may also offer manuals, installation guides, and training for race personnel and individual users/drivers. Finally, online portal 108 may provide an e-commerce front end for merchandise such as accessories and replacement parts.

FIG. 1 depicts vehicle 102 making its way around track 116. As briefly mentioned above, within vehicle 102 is a mobile track information station 130. Track information system 100 sends data (e.g. track condition information) to mobile track information station 130 via one or more of the mobile track control stations 114A-E. In this example, mobile track control station 114E is communicating a track condition message to vehicle 102 by way of mobile track information station 130 within vehicle 102. Mobile track information station 130 may receive, for example, information regarding track conditions, such as flag conditions (e.g., cautions), track control messages (e.g., red flag or stop messages), specific conditions (e.g., car wreck at turn 6) and other messages (e.g., weather alerts).

Figure 2A:
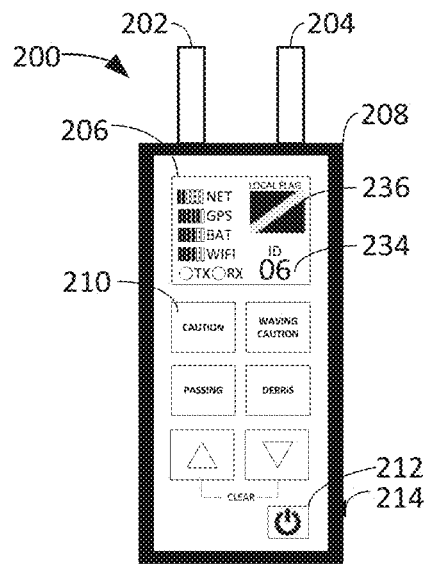
FIG. 2A depicts an example mobile track control station.

Though not shown in FIG. 1, the mobile track information station 130 within vehicle 102 may also communicate track or vehicle condition information back to any of mobile track control stations 114A-E. As above, such transmission may be received by a separate radio transceiver within the mobile track control station(s) that is configured for in an "always listen" mode. In some examples, the separate radio transceiver operates on a different frequency within a frequency band, or on a separate frequency band altogether, to avoid any interference with the mobile track control station network communications. An example mobile track information station is described in more detail below with respect to FIGS. 3A and 3B Example Mobile Track Control Station FIG. 2A depicts an example mobile track control station 200.

Mobile track control station 200 includes a display capable of displaying a wide variety of track condition or status information, as well as information regarding the status of mobile track control station 200 and the mobile track control station network. In this example, display 206 of mobile control station 200 is displaying a network strength indicator (related to the network of mobile track control stations), GPS strength indicator, battery level indicator, wireless network strength indicator (in this example, Wi-Fi), a transmit (TX) indicator, and a receive (RX) indicator. Notably, this is just one example of a display arrangement, and many other are possible. For example, a receive (RX) indicator may be included, which indicates that mobile track control station 200 is receiving information from another mobile track control station, or from a mobile track information station (e.g., within a vehicle).

Display 206 also displays a current track condition 236 (in this example, a local passing flag). The current track condition 236 (e.g., flag status) may change based on an alternative track condition indicated by a user of mobile track control station 200, such as if the user selects one of the track condition buttons (e.g., 210) associated with the different track conditions. In this example, several of the track condition buttons (e.g., 210) are associated with flags that would be normally used during a racing event, but in other examples, other conditions may be associated with one or more of the track condition button (e.g., conditions not associated with a particular flag, such as a weather condition or timing condition).

The indicated track condition 236 may also change if a track control application (such as 106 described with respect to FIG. 1) changes the track condition in a section or sector covered by mobile track control station 200, or changes a global track condition (i.e., a track condition applicable to all sectors of the track, such as a red flag or checkered flag).

The indicated track condition 236 may also display whether or not the indicated track condition is local or global. In this example, a "local flag" indication is displayed, but in other examples, a "global flag" or similar indication may be displayed.

Further in this example, a mobile track control station ID (or node ID) 234 is displayed on display 206. As discussed above with respect to FIG. 1, there may be a plurality of mobile track control stations linked to each other by a network, and each of the mobile track control stations may have its own unique mobile track control station ID (or node ID).

Though not depicted in this example, other information might be displayed on display 206, such as whether or not mobile track control station 200 is the "master" node in a network, or in which sector or section of a track mobile track control station 200 is located. Further yet, display 206 may indicate when mobile track control station 200 is in communication with a particular mobile track information station within a car, such as sending data to or receiving data from the mobile track information station.

As above, mobile track control station 200 also includes a plurality of buttons, which may be pre-programmed or dynamically programmable to indicate different track conditions. In one example, the button indications (e.g., "caution" for button 210) are printed on a flexible membrane that is waterproof. In other examples, the button indications may be stickers placed on such a membrane. In yet other examples, the button indications may be dynamic based on one or more displays disposed beneath the buttons.

In this example, the membrane has four buttons related to track conditions ("caution", "waving caution", "passing", "debris", two buttons for interface navigation (up arrow and down arrow), and a power button 212 for controlling the on and off state of mobile track control station 200. Further, as shown, holding the two navigation buttons simultaneously may be used to "clear" a condition.

Though not depicted in FIG. 2A, other multiple button arrangements may be implemented for accessing additional functions, such as menu structures and the like. For example, each button may be given multiple functions based on its interaction, such as a short press and a long press. In this way, a relatively compact user interface may enable many options. Other embodiments may have a different number or arrangement of buttons.

In one example, a specific button interaction (e.g., pressing two or more specific buttons at once) may allow the mobile track control station to enter a special menu or mode so that it can trigger global flag conditions. In this way, this way the mobile track control station can act as a backup to the track control application.

Though not depicted in FIG. 2A, the button indications may include graphics that are representative of associated flags, such as the design of known flags for "caution", "passing", "last lap", "race finish", "debris", and many others. Such graphics may assist a user in quickly ascertaining the correct button to press in the event of a track condition that needs to be indicated.

Mobile track control station 200 includes a plastic enclosure with a molded rubber cover 208. The molded rubber cover makes mobile track control station rugged and suitable for outdoor operation. Though not depicted in this example, mobile track control station 200 may include a hand strap on the backside configured to help a user hold mobile track control station 200.

Mobile track control station 200 further includes a first radio antenna 202 and a second radio antenna 204. As described above with respect to FIG. 1 and further below with respect to FIG. 2B, in some implementations, each of radio antennas 202 and 204 may be attached to distinct radio transceivers. In the depicted embodiment, radio antennas 202 and 204 are external to the enclosure, but in other embodiments, radio antennas 202 and 204 may be internal to the enclosure 208.

Mobile track control station 200 also includes an internal or external GPS antenna (not depicted in FIG. 2A) connected to a GPS receiver within mobile track control station 200.

Mobile track control station 200 also includes a jack 214, which may be used for charging as well as data communication (e.g., for uploading configuration data, software or firmware updates, and the like). For example, jack 214 may include four or more conductors and a port design such as USB, mini-USB, micro-USB, USB C, 3 mm "audio" jack, or other types capable of supplying power and/or data to mobile track control station 200.

Mobile track control station 200 may be configured to perform several operations. For example, powering on mobile track control station 200 may be accomplished by pressing and holding power switch 212, which may then cause display 206 to activate and to indicate network connectivity, GPS connectivity, battery state, Wi-Fi connectivity, mobile track control station ID (e.g., node ID), current status, and the like. To power off mobile track control station 200, a user may press and hold power switch 212 until display 206 goes blank.

To indicate a local track condition, such as a flag condition, a user may press a button (e.g., 210) associated with the relevant track condition. If the indicated condition is a local condition (e.g., local flag specific to a sector of the track), and the indicated condition is not overridden by a global condition (e.g., a global flag applicable to the entire track), then the current condition (e.g., flag) on display 206 will change to the selected condition (e.g., flag). The selected condition (e.g., flag) may also be displayed on a local LED signboard (not depicted) and transmitted to the track control application by way of a gateway and potentially on or more relaying mobile track control stations (such as described with respect to FIG. 1).

To deactivate a track condition (e.g., flag), a user may in some implementations press the same button again. For example, if the user pressed the "caution" button to activate a caution flag condition, then the user may press that same "caution" button again to deactivate the track condition. Alternatively, a user may press the "clear" button in order to clear the currently indicated condition. In some cases, a track condition may only be clearable by a track control application (such as a global track condition), and so any button press to clear the local track condition may merely send a message to the track control application requesting that the local condition be cleared. In some cases, the track control application may clear the track condition remotely by way of a command through the gateway and potentially one or more relaying mobile track control stations.

When using a local track information display device, such as an LED signboard (not depicted in FIG. 2A or 2B), the clearing of the track condition on mobile track control station 200 will also clear the track condition on the signboard. The local track information display device may be placed at various locations around the track and display condition, status, or other information to drivers on the track. In some embodiments, a local track information display device is located at each corner station on the track in order to display track conditions (e.g., digital flags) to drivers on the track.

In some embodiments, a local track information display device comprises a bright LED display panel, which may be controlled locally by a mobile track control station or remotely through the track control application (such as 106 described above with respect to FIG. 1).

Mobile track control station 200 may operate in several modes, such as a setup and an active mode.

When in setup mode, mobile track control station 200 is assigned a mobile track control station ID (e.g., node ID), which in some cases corresponds to a corner or flag station number for easy identification. As discussed above, the mobile track control station ID may also be associated with a position in a communication network topology, such as a ring-type network.

Also during setup mode, a master mobile track control station may transmit a track identifier, local Wi-Fi contact information (for updates and data uploads), alternate operational frequency (so multiple systems can operate in the same area), number of mobile track control stations in operation, and other parameters to a gateway as well as to other mobile track control stations in the network.

During active mode, each mobile track control station may transmit information to other mobile track control stations as well as to mobile track information stations within vehicles on the track (such as mobile track information station 130 in FIG. 1). As above, in some implementations, each mobile track control station may transmit and receive during assigned time slots in a TDMA network. Since the same information is retransmitted by mobile track control stations around the race track, substantial redundancy is built into the communications. The information transmitted in active mode may include, for example, the mobile track control station identifier (e.g., node identifier), identifiers associated with other mobile track control stations that can be heard, local and global track conditions or statuses (e.g., local and global flag statuses), group/car messages, track mode (hot, cold), and vehicle status information (e.g., incident reporting such as collision or stoppage), to name a few. Other information may be transmitted as well. In some implementations, the information is transmitted in data packets according to known data protocols.

Figure 2B:
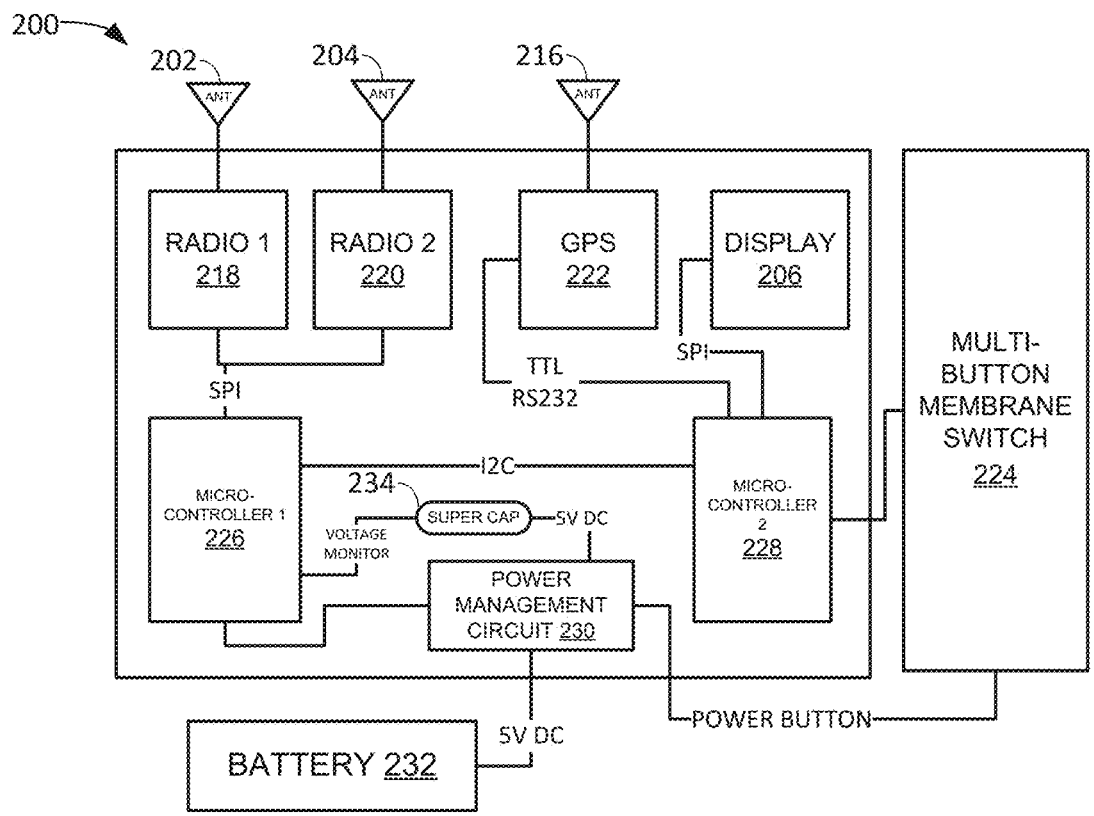
FIG. 2B depicts a block diagram depicting components of the example mobile track control station of FIG. 2A.

FIG. 2B depicts a block diagram of example components in the mobile track control station 200 of FIG. 2A.

In this example, mobile track control station 200 includes a first antenna 202 connected to a first radio transceiver 218 as well as a second antenna 204 connected to a second radio transceiver 220. In this example, the first radio transceiver 218 and the second radio transceiver 220 are both LoRa® (Long Range), spread spectrum radio transceivers. LoRa® is a digital wireless data communication technology that uses license-free sub-gigahertz radio frequency bands, like 169 MHz, 433 MHz, 868 MHz, and 915 MHz. LoRa® radio transceivers enable very-long-range transmissions (more than 10 km/6 miles in open areas) with low power consumption and so are well suited for a racetrack environment that may spread across miles of land. Further, in this example, both first antenna 202 and second antenna 204 are ultra-high frequency (UHF) external antennas. In some implementations, first antenna 202 and second antenna 204 are 433 MHz UHF antennas. However, in other embodiments, first antenna 202 and second antenna 204 may be of another design, such as an internal antenna design (e.g. a 3D antenna design).

In some implementations, first radio transceiver 218 and second radio transceiver 220 operate on different frequencies within a frequency band, or on different frequency bands altogether. Further, in some implementations, first radio transceiver 218 is used to communicate with (e.g., transmit to and receive from) the other networked mobile track control stations in the mobile track control station network, while second radio transceiver 220 is used only for receiving status information from a mobile track information station (e.g., in a vehicle), such as described below with respect to FIGS. 3A and 3B. In this way, mobile track control station network communications never interfere with a status indication coming from a mobile track information station within a vehicle (e.g., indicating a new and possibly unseen track condition reported by the driver or by crash detection circuitry or the like).

The first radio transceiver 218 and the second radio transceiver 220 are connected to a first microcontroller 226, for example, by serial peripheral interface (SPI), which is a synchronous serial communication interface regularly used in embedded systems. The first microcontroller 226 may be, for example, an ATmega328 or similar microcontroller, such as an Arduino Nano. Other microcontrollers may be equally suitable.

Mobile track control station 200 includes a second microcontroller 228 that is connected to the first microcontroller 226 via an interface, such as an inter-integrated circuit (I2C) bus, which is a synchronous, multi-master, multi-slave, packet switched, single-ended, serial computer bus. In some implementations, second microcontroller 228 is a Raspberry Pi Zero W controller which includes wireless LAN and Bluetooth connectivity. In other implementations, separate wireless LAN (e.g., Wi-Fi) and Bluetooth elements may be used instead.

Second microcontroller 228 is connected to a GPS receiver 222 via an interface, such as RS-232 interface using transistor-transistor logic (TTL). GPS receiver 222 is connected to GPS antenna 216.

Mobile track control station 200 may determine a common time reference to be used within the mobile track control station network based on GPS timing data provided via GPS receiver 222. Mobile track control station 200 uses the common time reference in order to transmit and receive data within designated time slots (e.g., in a time divisional multiple access (TDMA) scheme). In some cases, the timeslot assigned to a particular mobile track control station 200 is based on its mobile track control station ID (or node ID). Using its designated timeslots, mobile track control station 200 and other mobile track control stations may announce themselves and configure a mesh-type or ring-type communications network. Notably, while GPS is used in this example, other satellite positioning systems (e.g., GLONASS) may be used equally effectively.

In some implementations, GPS receiver 222 may further me used to determine the location of mobile track control station 200. The location may be used to plot the position of mobile track control station 200 on a map within a track control application, such as depicted below in FIG. 6A.

Second microcontroller 228 is further connected to display 206, which may be an LCD, OLED, transreflective, or other sort of display. The connection between microcontroller 228 and display 206 may be via an SPI interface in some implementations, as depicted in FIG. 2B.

Mobile track control station 200 also includes multi-button membrane switch 224, which is connected to second microcontroller 228 as well as power management circuit 230. As in the example in FIG. 2A, multi-button membrane switch 224 may provide a plurality of buttons corresponding to specific track conditions (e.g., flag statuses) that can be quickly selected by a user.

Mobile track control station 200 also includes power management circuit 230, which is connected, for example, to a power button of multi-button membrane switch 224 and to first microcontroller 226. In this example, power management circuit 230 is connected to first microcontroller 226 so that first microcontroller 226 can monitor the voltage of battery 232 and provide the status of the battery on display 206 (as depicted in FIG. 2A). In some implementations a super-capacitor 234 may be employed to prove for adequate warning time and safe shutdown in case of battery depletion.

Power management circuit 230 is further connected to battery 232. For example, battery 232 could be a 20,000 mAh battery or similar in some implementations, which should provide mobile track control station 200 with 10 or more hours of power.

Notably, FIG. 2B only depicts certain aspects of mobile track control station 200, and others are possible. For example, mobile track control station 200 may include an internal memory as well as an external memory port, such as an SD, micro-SD, or similar memory port.

Example Mobile Track Information Station

Figure 3A:
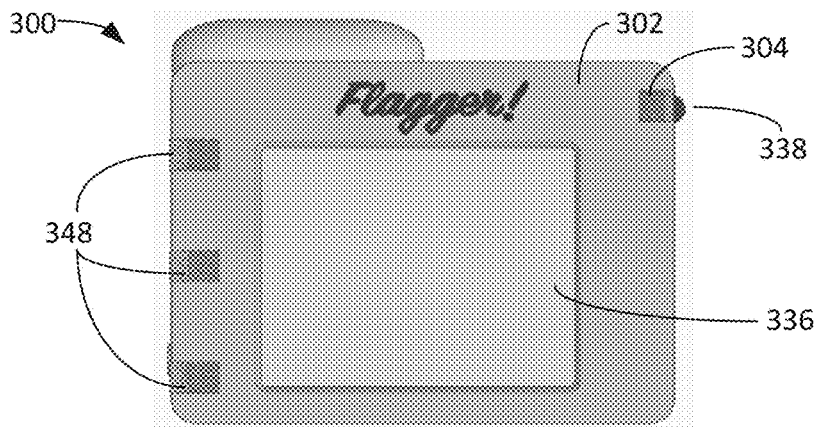
FIG. 3A depicts an example mobile track information station.

FIG. 3A depicts an example mobile track information station 300. Track information station 300 includes an enclosure 302, which may preferably be a sealed and rugged enclosure so as to be resilient to the elements. In this way, mobile track information station 300 may be used in enclosed vehicles as well as open-air vehicles.

Mobile track information station 300 includes a display 336, which in some embodiments may be a touch-sensitive display screen (e.g., a capacitive touchscreen) in order to allow a user to interact with a graphical user interface of mobile track information station 300. For example, a touch-sensitive display screen may be used to query driver's condition in case of emergency or to receive an acknowledgment of a message to the mobile track information station. Display 336 may be an LED display, OLED display, transreflective display, and other sorts. Further, display 336 may be monochromatic or color.

Mobile track information station 300 also includes a physical switch 338, which in this implementation is used as a power switch and a reset switch based on the length of time the switch is engaged. Though not depicted in this embodiment, mobile track information system 300 may include more than one physical switch in other implementations.

Mobile track information station 300 also includes light elements 304 and 348, which in some implementations may be LED lights. In some embodiments, the light sources (e.g., LED lights) may be mounted remote from the surface of the enclosure and a light pipe or other type of light guide may direct light from the light source to the surface of the enclosure.

Light elements 304 and 348 may be used for conveying information to a user even when display 336 is not active and drawing a user's attention to display 336 when it is active. For example, a bright color-coded flashing LED alert will draw attention to a track condition notification (e.g., flag condition) or other sort of message being displayed on the LCD screen.

In some implementations, light element 304 may act as a device status indicator, which may show a "heartbeat" to show the health of mobile track information station 300. Light element 304 may "beat" at a given interval that may be set (e.g., once a second) or user configurable based on battery life considerations. If a fault is detected with mobile track information station 300, such as long of network contact or low battery, light element 304 may change color and/or intensity and flash to alert a user.

In some implementations, display 336 may display track condition notifications, such as flags to a driver, which would have traditionally been waved at flag stations. Moreover, as described further below, mobile track information station 300 may be configured to only display the track condition information when it is relevant to a driver (e.g., in a caution zone) or when there is a full track condition (e.g., a red flag). Further, display 336 may be configured to display track information or other messages addressed to an individual car or a selected group of cars. As a few examples, an individual car may be sent a specific indication, such as a black or "meatball" flag, or a call to a specific location, such as a tech station on the grid, or to start one group of vehicles in a split-start race, just to name a few.

Mobile track information station 300 may be further configured for self-reporting conditions or incidents. For example, if mobile track information station 300 detects an impact of sufficient severity, or a stops on a track during an active session, or a spin, just to name a few, an alert may automatically be sent to, for example, the track control application. The alert may include, for example, a car identifier, a class or group identifier, a vehicle number, as well as details regarding the event, such as "12 G frontal impact" and the current location (e.g., GPS coordinates) of the vehicle. In the event of a severe incident, such as when an impact exceeds a force threshold, a message may automatically be displayed on display 336, for example, asking the driver if they need assistance. The driver may respond to such a query using the touch-sensitive display in this implementation, or physical buttons in other implementations. If the driver is unresponsive beyond a threshold period of time, a further alert may be issued to the track control application, which may prompt the sending of medical professionals and the like.

In this implementation, in order to power on mobile track information station 300, a user may press and release button 338, which wakes up a microprocessor which holds a power supply enable line (as depicted below in FIG. 3B). In order to power down mobile track information station 300, a user may press and hold button 338 for a threshold period of time (e.g., 2 seconds). Further, in order to "hard reset" mobile track information station 300, a user may further hold button 338 for a second threshold (e.g., 20 seconds).

In some implementations, upon startup of mobile track information station 300, a backlight turns on to illuminate an initial screen (e.g., a splash screen or ad screen). The initial screen may show information such as subscription status and/or expiration date of a subscription. The initial screen, or a subsequent screen, may show the currently configured car number with an option to change the number. In some implementations, a user may also select a run group or class at the same time as changing its number.

Once mobile track station 300 is initially configured (e.g., with car number, etc.), it may enter a running or "heartbeat mode" during which a light element 304 commences fading in and out at a regular interval (e.g., every 3 seconds) to indicate mobile track information station is operating, but without needing to run display 336, in order to save battery.

When mobile track information station 300 receives a track condition alert, such as a full course flag, general message, or directed message, or when mobile track information station 300 enters a flag zone, the heartbeat indicator will cease and the one or more of light sources 348 (e.g., high-intensity LEDs) will flash in order to alert the driver. Further, the relevant track condition information or message will be displayed on display 336 until cleared (remotely) or until mobile track information station 300 leaves the affected zone or sector of the track.

Figure 3B:
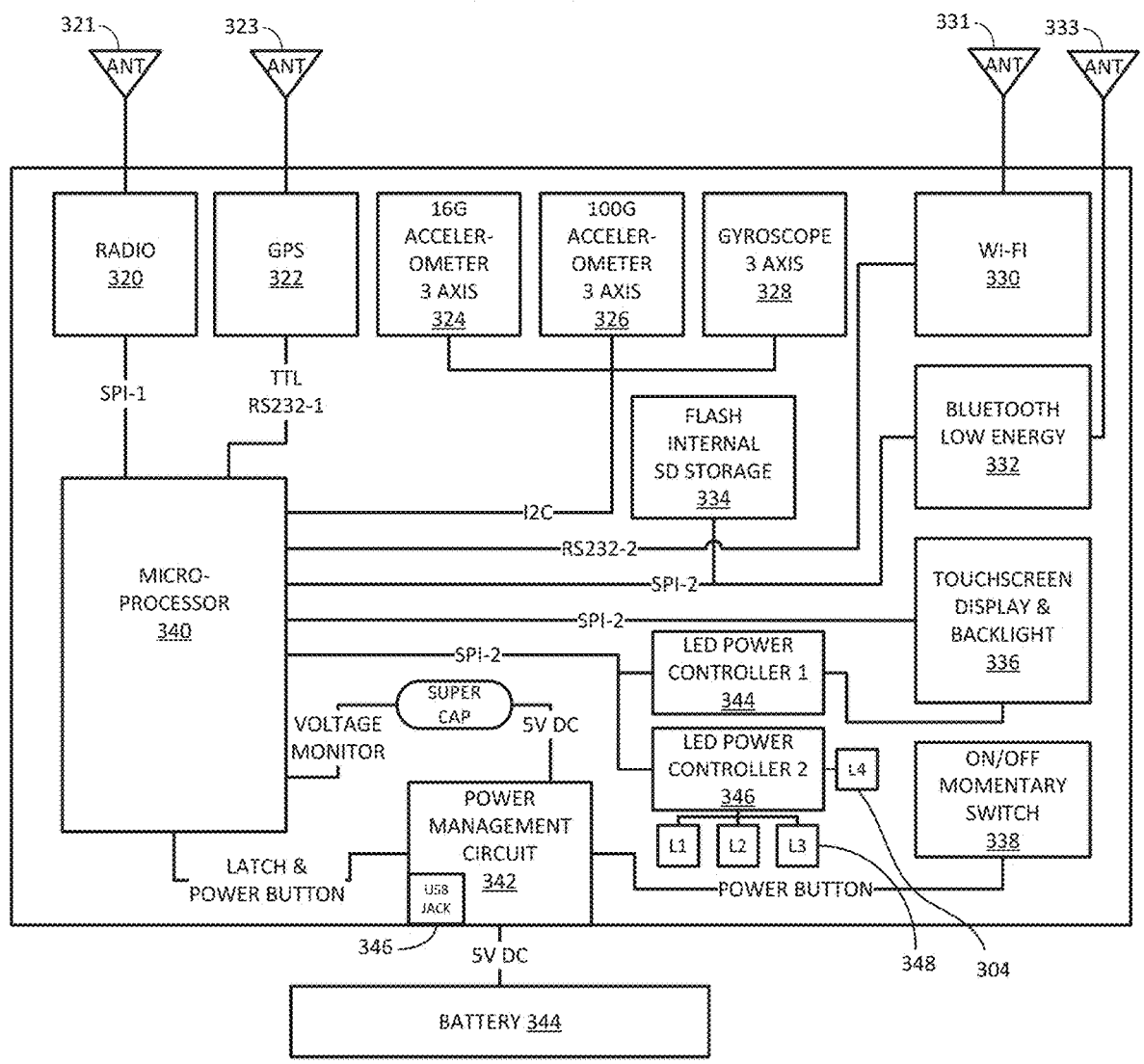
FIG. 3B depicts a block diagram depicting components of the example mobile track information station of FIG. 3A.

FIG. 3B depicts a block diagram depicting components of the example mobile track information station 300 of FIG. 3A.

Mobile track information station 300 includes a radio transceiver 320 connected to a UHF antenna 321 (e.g., a 433 MHz UHF antenna) as well as to a microprocessor 340. Radio transceiver 320 may be a LoRa®-type transceiver (as discussed above with respect to FIG. 2B) that is configured to receive track condition information from a track information system, such as described above with respect to FIG. 1, and in particular from a mobile track control station, such as described above with respect to FIGS. 2A and 2B.

Mobile track information station 300 includes a GPS transceiver 322, which is configured to receive GPS signals to determine location and speed information regarding mobile track information station 300. Notably, while GPS is used in this example, other satellite positioning systems (e.g., GLONASS) may be used equally effectively.

Mobile track information station 300 also includes a first three-axis accelerometer 324 and a second three-axis accelerometer 326. In the depicted example, first accelerometer 324 may have a smaller measurement range (16 G in this example), but may have much finer resolution over that range. For example, here first accelerometer 324 is configured to measure small G changes very accurately, such as vehicle motion (e.g., is the vehicle starting, stopping, and in what direction is the vehicle moving) as well as performance information (e.g., vehicle grip limits (lateral G), vehicle acceleration (forward G), and braking capability (backward G)). The acceleration data from first accelerometer 324 may be used for a variety of applications, including: calibrating the mounting position of mobile track information station 300.

For example, first accelerometer 324 may measure gravity and vehicle forward motion to determine the angle and tilt of the mobile track information station 300, which may improve the quality of the data provided by mobile track information station 300.

As another example, first accelerometer 324 may be used for GPS interpolation, such as where positioning data is temporarily lost (e.g., from bad signal reception, from tunnel transit, and the like). Because the positioning data from first accelerometer 324 is very accurate over a short period of time, it can be used to fill in the gaps between GPS positions for the most accurate caution zone detection.

As yet another example, the data recorded by first accelerometer 324 may be used to capture vehicle performance data that can be stored in the internal storage 334. Such data may subsequently be shared via upload over a wireless network connection, such as Wi-Fi or Bluetooth, to user's electronic device (e.g., smartphone). The vehicle performance data may also be provided by an online service, such as online portal 108 in FIG. 1.

Second three-axis accelerometer 326 may provide coarse acceleration data over a wider measurement range. Such data may be useful for measuring impact, roll over, or crash severity (e.g., as a black box type device). Such data may then be used to alert a mobile track control station of an event that requires a change in local (or global) track conditions, such as a caution flag or red flag.

As another example, the coarse data may be used to analyze the efficacy of safety systems within the vehicle (cages, wheel tethers, seat belts, seats, halo bars, carbon tubs, etc.) and driver safety systems such as helmets and head and neck restraints. By knowing the exact level and direction of impact, safety equipment manufacturers should be able to improve their products and sanctioning bodies can improve their regulations. The coarse data may only be stored temporarily. For example, in the event of an acceleration reading above a certain threshold (e.g., above 20 G), which suggests an accident, the five seconds of data before and after the event can be timestamped and stored for later analysis.

Mobile track information station 300 also includes a three-axis gyroscope 328, which may likewise be used to record performance data as well as event data, such a spin, rollover, or other accident event.

Mobile track information station 300 also includes a wireless communication transceiver 330, which in this example is a Wi-Fi transceiver, which is connected to a Wi-Fi antenna 331. Wi-Fi transceiver 330 may be used for data sharing between mobile track information station 300 and external devices and networks, for example, for software updates and configurations.

Mobile track information station 300 also includes a short-range wireless communication transceiver 332, which in this example is a Bluetooth transceiver, which is connected to a Bluetooth antenna 333. Bluetooth transceiver 332 may be used for data sharing between mobile track information station 300 and external devices. For example, Bluetooth transceiver 332 may allow a user to connect a mobile electronic device (e.g., a smartphone or tablet computer) to mobile track information station 300 to configure settings, update subscription plans, etc.

Mobile track information station 300 also includes a power switch 338, which in this example is a momentary on/off switch connected to power management circuit 342.

Power management circuit 342 is connected to power switch 338, battery 344, USB port 346, and microprocessor 340. Power management circuit 342 is configured to manage power states of mobile track information station 300 as well as to provide a battery level reference to a voltage monitor of microprocessor 340.

Microprocessor 340 provides data processing capabilities to connected elements of mobile track information station 300. Microprocessor 340 may be any sort of microprocessor or microcontroller, such as a SAM4S series ATMEL® microcontroller.

In this example, microprocessor 340 is in data communication with radio transceiver 320 (via a first SPI connection), GPS receiver 322 (via a first RS-232 connection), first accelerometer 324 (via an I2C connection), second accelerometer 326 (via the I2C connection), gyroscope 328 (via the I2C connection), Wi-Fi transceiver 330 (via a second RS-232 connection), Bluetooth transceiver 332 (via a second SPI connection), first LED power controller 344 (via the second SPI connection), second LED power controller 346 (via the second SPI connection), and internal flash storage 334 (via the second SPI connection). Notably, FIG. 3B depicts just one example configuration of processing elements and connections, and many others are possible.

Microprocessor 340 may provide the processing to perform several functions of mobile track information station 300, such as continually monitoring RF channels and updating internal tables of warning zones; continually monitoring GPS position; continually monitoring battery voltage; displaying appropriate track condition information (e.g., flags) when entering affected zones or sectors of a track; ceasing to display track condition information when leaving warning affected zones or sectors of a track; detecting dangerous vehicle conditions (e.g., stopped, spun, or crashed vehicles via sensors 324, 326, and 328) and automatically reporting the same via radio 320; maintaining a track database for detection of on/off track vehicle position; logging data (e.g., from sensors GPS 322, and 324, 326, and 328); running algorithms for detection of when a vehicle enters, exits, and when a vehicle is within a warning zones at high speeds.

In this example, first LED power controller 344 controls the backlight of the touchscreen display, and second LED power controller 346 controls the state (e.g., on and off, intensity, and color) of LEDs 348.

Though not depicted in FIG. 3B, the configuration of mobile track information station 300 allows for interaction with a large number of accessories or peripheral devices via, for example, the Bluetooth chip 332 and the USB jack 346. For example, audio alerts may be sent to a Bluetooth speaker system or existing in-car and Bluetooth capable sound system. Further, additional remote sensors may be integrated, such as remote GPS or other positioning system sensors, remote condition sensors (e.g., temperature or fire detection), remote OBDII integrations (e.g., to tap into a vehicle's existing data bus), and the like.

Example Data Protocol for Use with Elements of a Track Information System

Elements of a track information system, such as described above with respect to FIGS. 1, 2A, 2B, 3A, and 3B may utilize a custom data/messaging protocol.

Mobile track control stations such as described above may generally act as repeaters in a ring or mesh network as described above. In such a configuration, each mobile track control station may generally receive data from a sending node and re-transmit that data in its assigned time slot to a receiving node. In some cases, data may be added to the repeated messages by a mobile track control station (e.g., to indicate a local track condition) or by a track control application (e.g., to indicate a global track condition).

To provide redundancy, in some implementations each mobile track control station will aggregate messages from all other mobile track control stations that it can "hear". In the case of an intact ring network, there is not a problem since each mobile track control station (e.g., node) is responsible for adding/deleting its own local track condition information. However, in the case where there is a network fault, priority for reporting a local track condition may be given to the mobile track control station where the incident occurred.

By way of example, mobile track control station with node ID '4' can hear mobile track control stations with nodes IDs '2' and '3', but mobile track control station with node ID '3' cannot hear mobile track control station with node ID '2'. Mobile track control station with node ID '2' may add a condition indication (e.g., flag status) to the repeated message, but mobile track control station with node ID '3' cannot hear mobile track control station with node ID '2' so it repeats the message from mobile track control station with node ID '1' without the message from mobile track control station with node ID '2'. Mobile track control station with node ID '4' can hear mobile track control stations with node IDs '2' and '3' so it adds in the track condition notification from mobile track control station with node ID '2'. The same logic applies to clearing track conditions (e.g., flags.)

Data transmissions (e.g., messages or track condition notifications) may be configured with the following format:

TABLE 1

Example Data Protocol Message Format

| Data Item | Bytes | Description |
| --- | --- | --- |
| Message Source | 1 | Node number |
| Other Mobile Track Control Stations Received | 4 | Bitmask, each mobile track control station heard gets a bit set (up to 32 bits) |
| Reserved Error Code | 2 | E.g., used to indicate a detected error. |

TABLE 1-continued

Example Data Protocol Message Format

| Data Item | Bytes | Description |
|---|---|---|
| Global Condition | 1 | Lower nibble: number for full course event, double yellow, red, black, green, checker. 0 = CLEAR; Upper nibble: track status 0 = COLD, 1 = HOT, 2 = EMERGENCY |
| Local Corner Status 0 | 14 | Node number, Flag number, Start GPS LAT, LON, HDG, End GPS LAT, LON, HDG. LAT and LON are offsets from S/F in meters. E.g., packed in this way: Node U8, Flag U8, SLAT S16, SLON S16, SHDG U16, ELAT S16, ELON S16, EHDG U16 |
| Local Corner Status 1 | 14 | |
| ... | ... | |
| Local Corner Status n | 14 | |
| Remote Corner Status 0 | 14 | Same as local but set by Track Control Application |
| Remote Corner Status n | 14 | |
| ... | | |
| Incident Report 1 | 23 | Group Name 4, Vehicle ID 4, GPS LAT 6, GPS LON 6, Incident Code 1, Severity/Direction 2 |
| ... | | |
| Incident Report n | 11 | |
| Group Flag | | Group Name 4, Flag number 1 |
| Group Message | | Group Name 4, Text of message 20 |
| Vehicle Flag | | Group Name 4, Vehicle ID 4, Confirm 1, Flag number 1 |
| Vehicle Message | | Group Name 4, Vehicle ID 4, Confirm 1, Text of message 20 |
| Vehicle Query Y/N | | Group Name 4, Vehicle ID 4, Answer 1, Text of message 20 |

In the example depicted in Table 1, the first byte is the node number transmitting the message. This will increment as the message goes around the ring. Next is a bitmask of all the mobile track control stations that have reported. When the system is operating correctly, for example, with 14 mobile track control stations, this will be "00000000 00000000 00111111 11111111" showing 14 ones indicating messages received from all mobile track control stations. If a mobile track control stations fails to report, a 0 will be shown in the appropriate bit and this will be indicated to the track control application. It may be normal to have an occasional dropped mobile track control station message, but repeated failures will prompt corrective action.

The next data segment is an Error Code. This is an area where mobile track control stations may report faults such as low battery that may need attention.

Next follows the dynamic list of incidents on the track. Global condition indications are set and cleared by the track control application generally, and are displayed as quickly as possible on all mobile track information stations. Global condition indications generally take priority over local condition indications (such as may be set by a mobile track control station). Local condition indications are set by operators of the mobile track control stations when they observe an incident and are only shown on a mobile track information station when it is in an affected area. The local condition indications can be cleared by the relevant mobile track control stations or by the track control application.

Remote local condition indications (i.e., local conditions set by the remote track control application) are set and cleared by the track control application and may be configured to take precedence over local condition indications set by mobile track control stations.

Generally, each condition indication may include the following information: node number reporting the incident; specific condition or flag; zone start north/south and east/west coordinates as an offset from the start/finish line GPS position (e.g., in meters, feet, etc.); zone start compass heading; zone end north/south and east/west coordinates from the start/finish line GPS position (e.g., in meters, feet, etc.); and zone end compass heading.

In the infrequent case of a vehicle incident, a mobile track information station will compose and send a message via the network of mobile track control station. The message may be received by a first mobile track control station, which will in-turn add it to the repeated message list. The mobile track control station associated with the gateway (e.g., having a node ID of 0) will remove the message when it has been received by the gateway.

An incident report may include the group and vehicle ID of the mobile track information station, the GPS coordinates of the vehicle, and a code indicating what type of incident (spin, stoppage, off-track, collision, etc.). More than one incident report may be included in the repeated message list circulating the mobile track control station network at one time.

Occasionally, track personnel may wish to send a message or flag to a group or to an individual mobile track information station. These messages may be inserted into the repeated message list by the mobile track information station associated with the gateway (e.g., with node ID 0) and these messages may remain in circulation until cleared by the track control application.

An individual message or flag may require a confirmation or Yes/No answer to a query. If the mobile track information station receives such a request, the driver can acknowledge the message by touching the touchscreen. This will cause a message to be transmitted to a mobile track control station, which will modify the confirm or answer status in the repeated message.

Example Processes for Mobile Track Information System

Figure 4A:
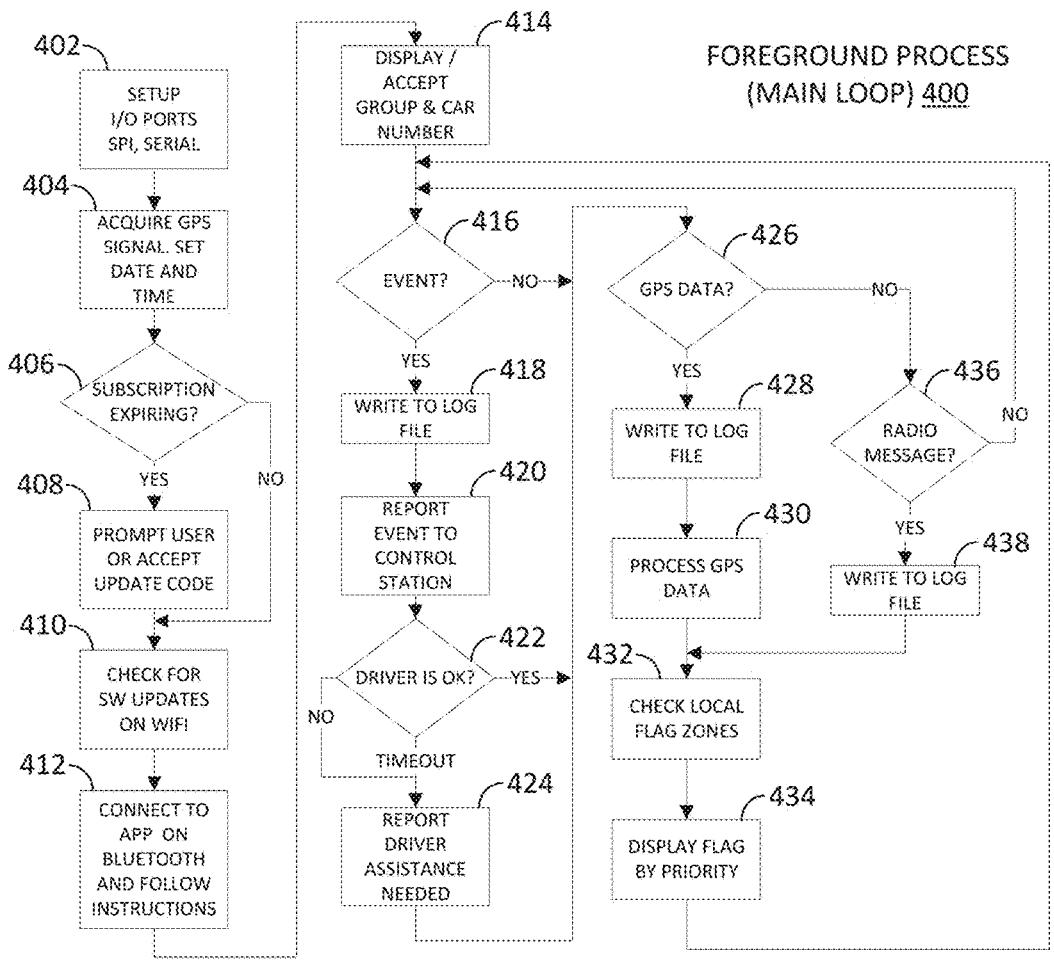
FIG. 4A depicts an example of foreground process flows for the example mobile track information station of FIGS. 3A and 3B.

FIG. 4A depicts an example of foreground process flow 400 for the example mobile track information station of FIGS. 3A and 3B. For example, process flow 400 may be processed by microprocessor 340 in FIG. 3B.

Process flow 400 begins at step 402 where input/output ports, SPI connections, and serial connections (e.g., RS-232) are configured. For example, the data connections depicted in FIG. 3B may all be initiated at step 402.

Process flow 400 then proceeds to step 404 where a satellite positioning signal, such as GPS, is acquired in order to set an accurate date and time.

Process flow 400 then proceeds to step 406 where a user's subscription status is checked. For example, in some implementations, a user may need an active subscription to a track information system in order for the user's mobile track information station to work within the track information system.

If at step 406, the subscription is expiring soon or already expired, the process flow 400 proceeds to step 408 where a user is prompted regarding the status of the subscription and given the opportunity to update or renew the subscription, such as by providing an update code.

If at step 406, the subscription is not expiring soon or not already expired, then process flow 400 proceeds to step 410. Alternatively, after the user completes step 408, process flow proceeds to step 410. At step 410, the mobile track information system checks for software updates using, for example, a Wi-Fi connection (e.g., via Wi-Fi transceiver 330 in FIG. 3B).

Process flow 400 then proceeds to step 412 where the mobile track information station connects to an application on an electronic device (e.g., a smartphone or tablet computer). The application may allow configuration of the mobile track information station, subscription management, etc. Further, the application may allow a user to input a car number and a group identification (e.g., a run group, race class, or similar).

Steps 402 to 414 are primarily for setting up a mobile track information station for use in a track information system. Once the setup process is complete, process flow 400 moves into a main operational loop starting with step 416, where the mobile track information station checks for an event, such as a crash, rollover, spin, impact, or stopped car. As described above, on-board sensors such as the first and second accelerometers (324 and 326 in FIG. 3B), gyroscope (328 in FIG. 3B) and GPS (322 in FIG. 3B) may all report data that is compared to various thresholds or event models to determine whether any safety event has occurred.

If at step 416 an event is detected, the process flow 400 proceeds to step 418 where the event data (e.g., data from onboard sensors as well as a timestamp) are written to a log file. The log file may be stored, for example, in internal storage 334 depicted in FIG. 3B.

Process flow 400 then proceeds to step 420 where the event is reported to a mobile track control station, such as depicted and described with respect to FIGS. 2A and 2B. For example, the event may be reported in a broadcast message from the mobile track information station's LoRa® radio transceiver (e.g., radio 320 in FIG. 3B) and received by a mobile track control station's dedicated receive-only LoRa® radio transceiver (e.g., radio 220 in FIG. 2B).

Process flow 400 then proceeds to step 422 where a message is displayed on the display of the mobile track information system inquiring as to the status of the driver. For example, a touchscreen display, such as described with respect to FIGS. 3A and 3B, may be used to query driver's condition in case of an emergency or to receive an acknowledgment of a message to the mobile track information station.

If at step 422, the driver reports that he or she is not OK (e.g., by selecting an appropriate button on the touchscreen display), then process flow 400 proceeds to step 424 where a driver needing assistance indication is reported to a mobile track control station.

If at step 422, the driver reports that he or she is OK (e.g., by selecting an appropriate button on the touchscreen display), then process flow 400 proceeds to step 426. Alternatively, if at step 416 no event is detected, then process flow 400 likewise proceeds to step 426.

At step 426, mobile track information station checks whether or not any GPS messages have been received.

If at step 426, a GPS data has been received, then it is written to a log file at step 428. Thereafter, the GPS data is processed to determine, for example, time to the millisecond, speed, heading, position, signal strength, and number of satellites.

Process flow 400 then proceeds to step 432 where the current GPS position and heading is compared with messages received indicating a caution zone. IF it is determined that the vehicle is entering or within a caution zone, then the appropriate flag condition is displayed based on priority at step 434. If it is determined that a vehicle is exiting a caution zone, the flag condition is removed from the in-car display.

As discussed in more detail below with respect to FIG. 5, in some implementations the track condition notifications are checked for relevance to the mobile track information station before being displayed (e.g., at step 434). For example, a local track condition notification applicable to a remote sector may not be displayed, but a local track condition notification applicable to a sector in which the mobile track information station currently resides, or a global track condition notification may be displayed.

If at step 426, no GPS message has been received, then process flow 400 proceeds to step 436 where mobile track information station checks whether or not any radio messages have been received and processes any received messaged by updating an internal status table of active caution zones.

If at step 436 a radio message has been received, then the message is written to the log file at step 438. If at step 436 no radio message has been received, then process flow 400 returns to step 416, and the process continues as described above.

Figure 4B:
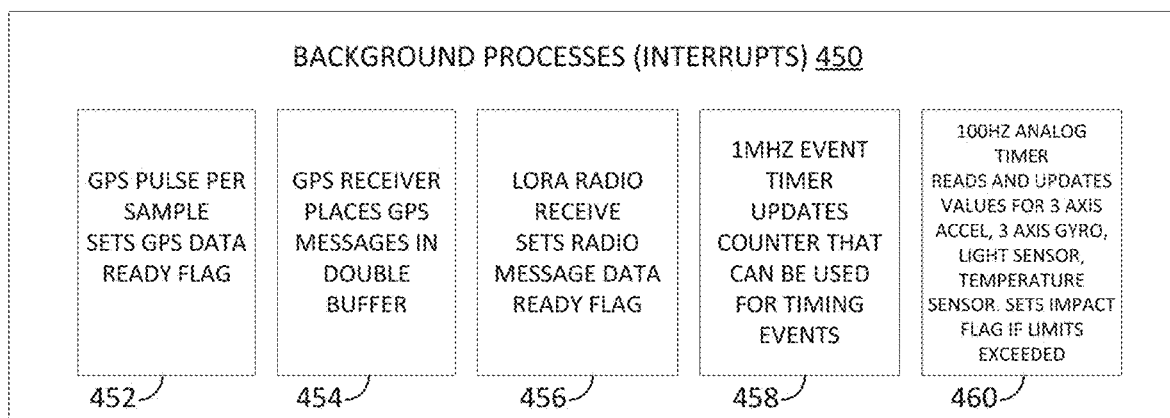
FIG. 4B depicts an example of background processes for the example mobile track information station of FIGS. 3A and 3B.

FIG. 4B depicts an example of background processes 450 for the example mobile track information station of FIGS. 3A and 3B. Background processes 450 may be running in the background while a mobile track information station is executing the foreground processes described above with respect to FIG. 4A.

Background processes 450 include process 452 in which a GPS pulse per sample sets a GPS data ready flag. In other words, if GPS data is being received, then the GPS data ready flag is set to reflect the successful reception of such data.

Background processes 450 also include process 454 in which a GPS message has been completely received and verified. The message is placed in a memory buffer where it may be accessed for a foreground process for updating internal status tables and logging in step 426. Further, a GPS message data ready flag may be set after receiving GPS message data. This flag may be examined at step 426 in FIG. 4A.

Background processes 450 also include process 456 in which the LoRa® radio receives data and sets a radio message data ready flag. This flag may be examined at step 436 in FIG. 4A.

Background processes 450 also include process 458 in which a periodic event timer, for example a 1 MHz event time, updates a counter that can be used for timing events (e.g., for flashing light elements, such as LED indicators 304 and 348 of FIG. 3B).

Background processes 450 also include process 460 in which periodic data sample timer, for example a 100 MHz data sample timer, reads and updates values for various onboard sensors, such as for the accelerometers, gyroscope, and GPS sensors described above. Though not described with respect to FIG. 3A, other sensor data may likewise be measured, such a temperature sensor, light sensor, and others. With each data sample, the mobile track information system may determine whether an event, such as a spin, rollover, crash, impact, or stopped car has occurred, such as described with respect to step 416 in FIG. 4A.

Notably, the background processes 450 described with respect to FIG. 4B are just some examples, and many others are possible.

Example Methods for Sector or Zone Detection

Figure 5:
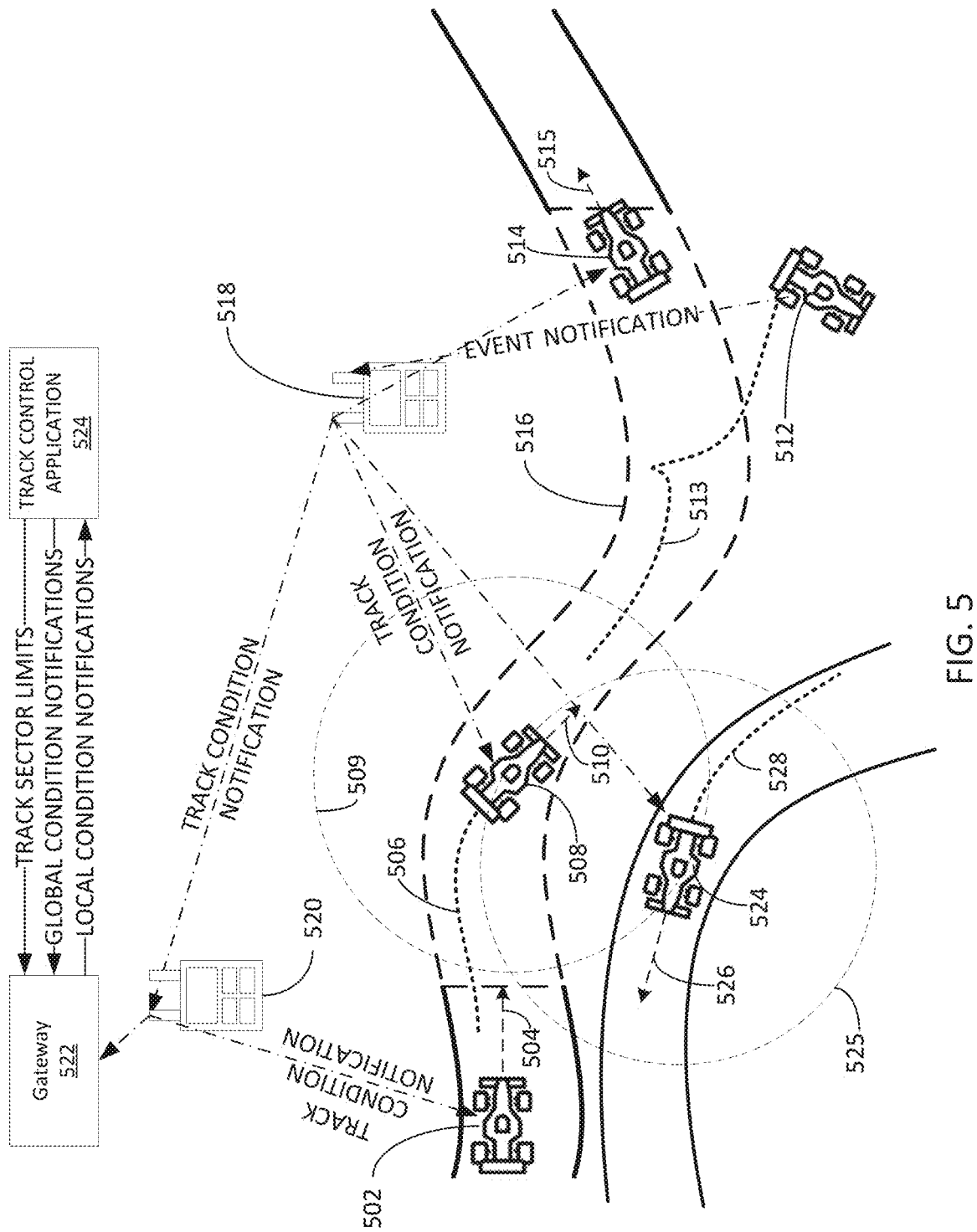
FIG. 5 depicts an example of zone detection in a track information system, such as depicted and described with respect to FIG. 1.

FIG. 5 depicts an example of zone or sector detection in a track information system, such as depicted and described with respect to FIG. 1.

Several vehicles are depicted in FIG. 5 to demonstrate various functions of the track information system. In this example, vehicle 512 has had an event, including a spin, an off-track excursion, and a vehicle stoppage while under an otherwise green or "hot" track condition. One or more of these events may be automatically reported to mobile track control station 518 by a mobile track information station within vehicle 512, as discussed above. The reported event may include, for example, a group and/or number or other identifier for vehicle 512 as well as the GPS location where the event occurred. The reported event will be received by a mobile track control station, in this case 518. This, along with the GPS position will determine that the event occurred within sector 516.

Because vehicle 512 may be outside the bounds of sector 516 (as indicated by the dashed track extent lines in sector 516), in some examples a determination of the relevant sector may be based historical positions 513 of vehicle 512. In this case, the historical positions 513 along with the relevant sensor data may indicate that one or more of the aforementioned events happened within sector 516.

As depicted, the reported event from vehicle 512 is received by a second radio transceiver within mobile track control station 518, which is configured to always listen for event notifications. For example, as described above, one radio transceiver of mobile track control station 518 may be configured for listening for events while another may be configured for participating in a mobile track control station network.

After receiving the event notification, a track condition is triggered by a user of mobile track control station 518, which causes mobile track control station 518 to transmit a track condition notification (or "alert") out to other mobile track control stations (e.g., 520) in the mobile track control station network as well as vehicles within range of mobile control track station 518, such as vehicle 508. As depicted, the track condition notification may also be transmitted to gateway 522 and ultimately onto track control application 524. In this example, mobile track control station 520 may be a master mobile track control station (or node) within the mobile track control station network that includes mobile track control stations 518 and 520.

In some implementations, the track sector (or zone) limits (e.g., 516) may be downloaded to gateway 522 from track control application 524. Thereafter, gateway 522 may transmit the track sector limits may be shared with the mobile track control station network and optionally stored (e.g., in an internal memory) by the mobile track control stations and the mobile track information stations. The track sector limit data may include a plurality of position coordinates (e.g., GPS coordinates) that form a track sector area. In some cases, the track sector limit may encompass the track area itself as well as run-off area. So, for example, vehicle 512 may still be considered to be in sector 516 despite being off track.

The track sector limit data may further include heading information regarding the entry and exit of the track sector. In some cases, the heading information may be a range of "expected" entry or exit headings, which allows for vehicles to enter the sector, or exit the sector, on different racing lines. For example, the expected headings may be based on a range of degrees about cardinal axes (e.g., entering the sector between 80 degrees and 100 degrees in a westerly heading).

In one implementation, the track sector limits are stored in gateway 522 until an event occurs. When the event occurs (e.g., when vehicle 512 spins off the track), the event notification makes its way through the mobile track control station network to gateway 522, which prompts gateway 522 to then transmit track sector limits to the mobile track control station network. In some cases, the track sector limit data may include track sector limits of only the affected sector (e.g., here, sector 516) so as to maintain efficient use of network resources. In some cases, gateway 522 may determine the relevant track sector limits to share with the mobile track control station network based on position data shared in the event data provided by vehicle 512's mobile track information station.

In another implementation, all of the track sector limit data may be shared with the mobile track control stations and mobile track information stations prior to an event, which may shorten response times. In such cases, when an event occurs, a mobile track information station may be able to report a relevant sector of the event along with its position and other sensor data regarding the event.

In the example depicted in FIG. 5, vehicle 508 includes a mobile track information station (not depicted) that receives the track condition notification from mobile control track station 518 and determines whether it should be displayed within vehicle 508. The track condition notification may include, for example, an identification of a zone or sector of the track which is affected by the track condition notification, which in this case is sector 516 (as indicated by the dashed track outlines in FIG. 5). As above, the track condition notification may also include sector limit data so that vehicle 508's mobile track information station can determine that it is in an affected sector. For example, vehicle 508's mobile track information station may determine whether or not vehicle 508 is within the affected sector 516 by referring to its current position and heading (e.g., GPS) data.

In some cases, due to the design of a track for example, the current position data may not be sufficient to confidently determine that a vehicle is in an affected sector. In such cases, vehicle 508's mobile track information station may need to make an additional determination to decide whether to display the track condition notification.

For example, whereas here the track bends back on itself and has two portions of the track in close proximity, but in completely different sectors or zones, then the mobile track information station may need to ensure that it is indeed within the correct sector or zone before displaying a track condition notification. This is because the location data from its satellite positioning system (e.g., GPS system) may have some uncertainty, as indicated by the dashed circle 508 around vehicle 508. As can be seen, at the extent of the dashed circle is another portion of the track that is not in affected sector 516. To resolve this issue, vehicle 508's mobile track information station may check its heading 510 as well as historical track position data 506 (e.g., stored in an onboard storage such as 334 in FIG. 3B).

Vehicle 508's heading 510 when entering a sector or zone may be used to increase the likelihood that vehicle 508 is in the affected sector 516 because, as described above, each sector may be defined with a discrete range of entry headings into the sector. This sector heading entry range can be compared to the heading of vehicle 508 when entering sector 516 based on its historical track position data 506.

In some cases, such as extremely sharp turns after an entry to a sector, vehicle 508's heading may not be dispositive regarding whether or not vehicle 508 is in affected sector 516. Thus, vehicle 508's previous position data 506 may be used to further improve the determination of what sector vehicle 508 is currently in. For example, historical track positions 506 provide further location fixes that may be used to determine an increased likelihood that vehicle 508 is indeed in sector 516. For example, if a threshold number of fixes in historical track positions 506 all fall within sector 516, then a mobile track information station within vehicle 508 may be more confident in its determination of what sector vehicle 508 is in.

The amount of historical track position data (e.g., 506, 513, and 528) stored by a mobile track information station may be limited in time or distance covered so as to not conflate multiple track sector entries and exits.

In another example, vehicle 524 may receive a track condition notification from mobile track control station 518 and face the same issue of resolving whether the notification should be displayed by its mobile track information station. Vehicle 524 is in a different sector of the track that is nevertheless adjacent to the affected sector 516 and potentially within an area of positional uncertainty, as depicted by circle 525. Thus, vehicle 524's mobile track information station may review its current position, heading 526, and historical track position data 528 as well in order to determine that it is not in affected sector 516, and thus should not display the track condition notification.

Vehicle 502 may also receive the track condition notification by way of a relay from mobile track control station 520. Generally, a mobile track information station within vehicle 502 would not display the track condition notification because it is not within the affected sector 516. However, in some cases, vehicle 502's mobile track information station may be configured to display the notification if vehicle 502 is within a threshold distance or time of entering affected sector 516. This determination may be based on, for example, vehicle 502's location, heading 504, and speed. If vehicle 502's mobile track information station determines based on its heading 504 and speed that it is entering the affected sector 516 (or, alternatively, will soon enter based on a time or distance threshold), then the track condition notification may be displayed within vehicle 502 despite it being outside of affected sector 516. Such a system may maintain the benefit of not displaying track condition notifications within vehicles where the notification would not be relevant, while maintaining the flexibility to give sufficiently early warning to vehicles that will imminently enter an affected sector—especially where a given sector may be particularly short, have difficult sightlines, or the like.

Similarly, vehicle 514 may also receive the track condition notification from mobile track control station 518. In this case, vehicle 514's mobile track information station would display the track condition notification because it is within affected sector 516. Upon exiting sector 516, vehicle 514's mobile track information station would cease displaying the track condition notification.

As above, generally a mobile track information station may display a track condition notification until the vehicle exits the affected sector. Optionally, if an incident happens prompting a local track condition (e.g., flag) when vehicle 514 is imminently exiting the affected sector, the mobile track information station within vehicle 514 may determine based on vehicle 514's location, heading 515, and speed that it will soon leave the affected sector 516 (e.g., based on some time or distance threshold) and determine not to display the track condition notification in vehicle 514. This flexible design allows for tuning a notification strategy to maximize the display of relevant track condition information to drivers, while minimizing driver distraction by avoiding displaying track condition information that is not relevant to a driver.

Example Track Control Application

Figures 6A, 6B:
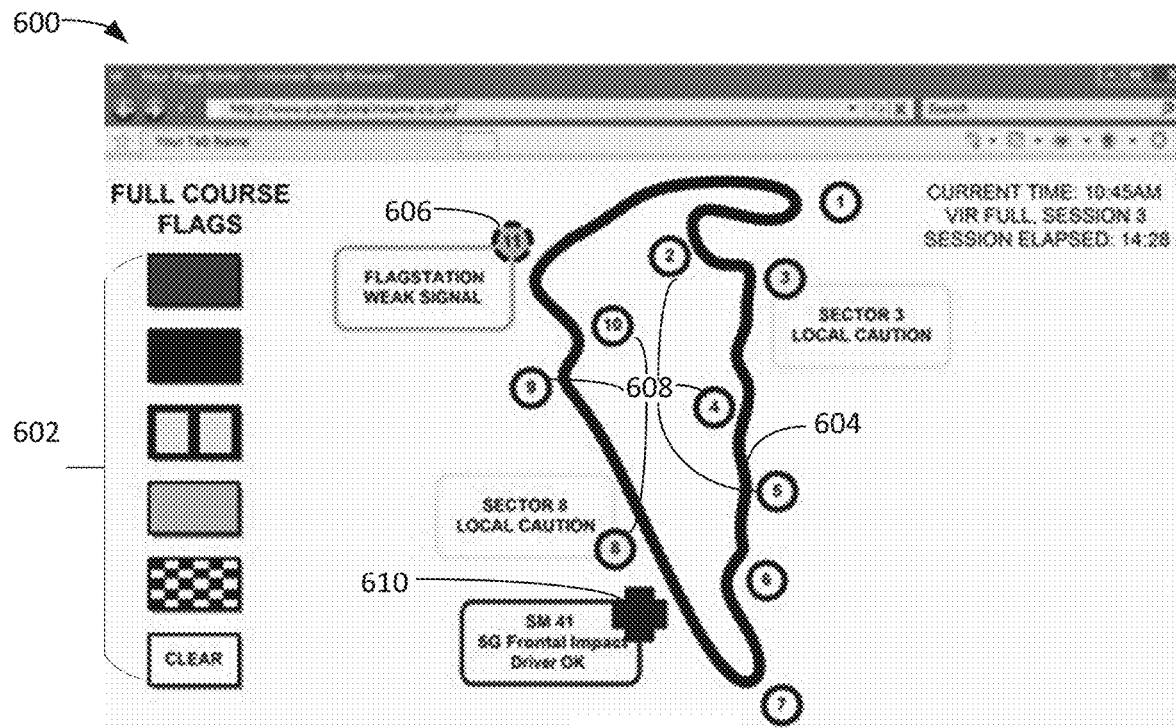
FIG. 6A depicts an example of a track control application.
FIG. 6B depicts an example live event log, such as may be displayed by the track control application depicted and described with respect to FIG. 6A.

FIG. 6A depicts an example of a track control application 600 (such as 106 in FIG. 1). In regular operation, track control application 600 may depict full course flag controls 602, which may be used to set the track condition of the entire track at once.

Track control application 600 also depicts a full track map 604, including various sectors, which may have individual indications of track condition.

Track control application 600 also depicts status indications (e.g., 606) related to mobile track control stations as well as vehicle indications (e.g., 610) as reported from mobile track information stations.

Track control application 600 may also depict the location and identity of mobile track control stations 608, which may also coincide with track corner numbers or designations. In this example, the location and identify of the mobile track control stations also indicate (e.g., by their color) the status of the local track indications associated with the mobile track control stations, which may differ from mobile track control station to mobile track control station. The status of each mobile track control station may also be indicated, including things such as network connection, internal faults, battery life, etc. For example, mobile track control station 606 is indicated as having a weak signal in FIG. 6A.

Track control application 600 may include several other functions, which are not depicted in FIG. 6A. For example, track control application 600 may allow various configurations, such as for selecting a track, track layout, types of flags in use, full course flag controls, which provide a means for activating flags at all locations on a track; and local flag controls, which provide a means for activating flags at select locations on a track, among others.

In some cases, track control application 600 may be configured for touch operation, such as using a touch sensitive mobile device (e.g., phone or tablet) or another computer with a touch-sensitive display. For example, in FIG. 6A, the graphical user interface of track control application 600 includes full course flag controls which allow for touching a flag to change the status of the track and all the mobile track control stations.

The graphical user interface of track control application 600 also includes local flag controls which allow for touching a local flag. In some cases, setting a local flag will prompt a new user interface element, such as a pop-up menu, to display options that can be selected while setting a local flag. Other options may include viewing an incident log or viewing a video recording, or the like.

The full course and local flag commands may be transmitted to mobile track control stations system via a gateway (such as 104 in FIG. 1).

Track control application 600 may maintain a live event log in which every track event is logged in detail with a date and time stamp, such as shown by way of example in FIG. 6B. In this example, live event log 650 includes dates, times, severity, scope, source, and location of track conditions, such as flags. However, live event log 650 is just one example, and many other configurations are possible. For example, the various columns of data may be removed, new columns of data added, the order of data columns reversed, etc.

Track control application 600 may be implemented on a variety of electronic device platforms, including computers and mobile devices, and may operate with or without continuous internet connectivity. For example, track control application 600 may only need a local network connection to a gateway (such as depicted in FIG. 1) in order to operate, though certain functionalities may be limited without a connection to an external network.

In the example depicted in FIG. 6A, track control application 600 is browser-based, which lends to it being fast and easy to startup, widely interoperable with different device types, capable of remote maintenance and upgrades, and generally more reliable than other native-software-based applications.

Track Digital Video Recorder

Some implementations of a track information system, such as described with respect to the FIG. 1, may further include a track Digital Video Recorder (DVR) that comprises cameras positioned around a track with access to local and/or remote data stores. For example, a track DVR may be installed at corner stations.

In some embodiments, the track DVR may record continuously on a loop so as to always be running, but so as to limit the amount of storage space necessary. The track DVR may be triggered to permanently store a recorded video segment based on a condition on the track, such as may be indicated by the network of mobile track control stations described above. For example, if a track condition notification (e.g., caution flag) is issued for a particular portion of a track, the Track DVR may permanently store a video file starting a period of time before the condition was initiated (e.g., by the track information system) and ending either at a fixed time after the start (e.g., 5 minutes) or ending after another condition is set, such as when the caution condition/flag is withdrawn. In some implementations, the track DVR may be triggered to permanently record a video clip when a track control application issues a track condition notification.

In some embodiments, the track DVR may store permanently recorded clips locally (e.g., in a local memory such as on a hard-drive, USB drive, SD card, or the like). In other embodiments, the track DVR may have a network connection and may upload the recorded clips to a network location (e.g., via local network 110 or external network 118 in FIG. 1).

In some implementations, the track DVR may upload the videos to the track control application, which may thereafter store the video in a database or similar data structure configured to associate the video with a track condition event (such as events noted in the example event log of FIG. 6B).

For example, if a vehicle on track has an accident in a certain sector of the track, track personnel may set a local track condition using a mobile track control station, which in turns causes the mobile track information stations (and also relevant digital signboards) to display a yellow/caution condition. This would in-turn send a message to the track control application to make a permanent video recording via one or more relevant track DVR cameras. That permanent video recording may be uploaded to the track control application thereafter and associated with the event. In this way, all track conditions may be later reviewed, for example, for determining the performance of the track personnel.

Example Methods Performed by Elements of a Track Information System

Figure 7A:
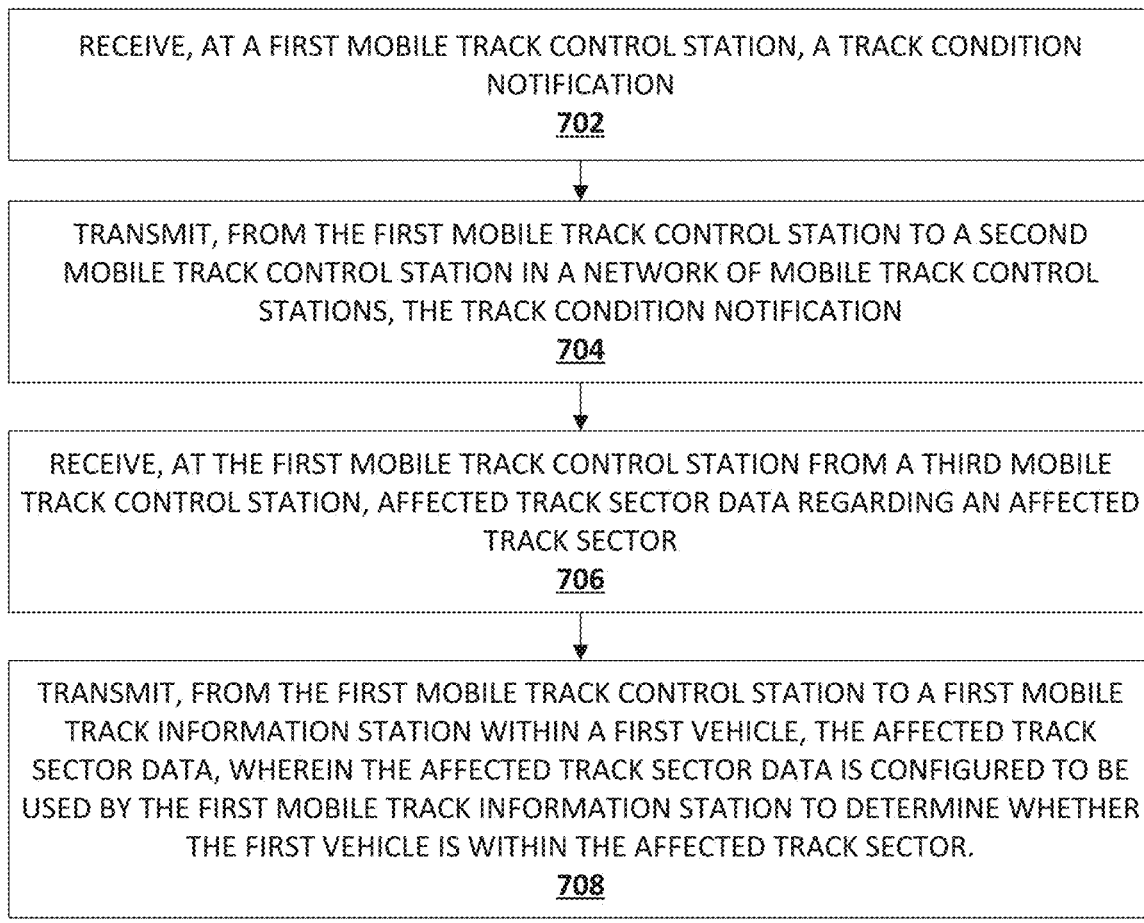
FIG. 7A depicts an example method performed by a track information system, such as depicted and described with respect to FIG. 1.

FIG. 7A depicts an example method performed by a track information system, such as depicted and described above, for example, with respect to FIG. 1. In particular, method 700 depicts a technique for providing track condition information in a track information system.

Method 700 beings at step 702 with receiving, at a first mobile track control station, a track condition notification. For example, the mobile track control station may be as described above, for example, with respect to FIGS. 2A and 2B, above. In some implementations, receiving the track condition notification comprises receiving an indication that a first physical button associated with the track condition, of a plurality of pre-configured physical buttons of the first mobile track control station, was pressed. For example, the button may similar to the buttons described above with respect to FIG. 2A.

Method 700 then proceeds to step 704 with transmitting, from the first mobile track control station to a second mobile track control station in a network of mobile track control stations, the track condition notification. In some implementations, the network of mobile track control station comprises a ring network, wherein each mobile track control station within the network of mobile track control station comprises a unique node ID, such as described above with respect to FIG. 1. Further, in some implementations, transmitting the track condition notification to the second mobile track control station is based on a node ID of the second mobile track control station.

Method 700 then proceeds to step 706 with receiving, at the first mobile track control station from a third mobile track control station, affected track sector data regarding an affected track sector. For example, the track sector data may be as described above, for example, with respect to FIG. 5.

Method 700 then proceeds to step 708 with transmitting, from the first mobile track control station to a first mobile track information station within a first vehicle, the affected track sector data. The affected track sector data may be configured to be used by the first mobile track information station to determine whether the first vehicle is within the affected track sector.

In some implementations, the first mobile track control station comprises a first radio transceiver configured for data exchange with the network of mobile track control stations, such as radio 218 in FIG. 2B. In some implementations, the first mobile track control station comprises a second radio transceiver configured to receive event notification data from a mobile track information station, such as radio 220 in FIG. 2B.

Though not depicted in FIG. 7A, method 700 may also include receiving, at the first mobile track control station from a second mobile track information station within a second vehicle, an event notification, wherein receiving the track condition notification at the first mobile track control station is based on receiving the event notification.

Notably, method 700 is just one example, and many other methods such as described herein are possible.

Figure 7B:
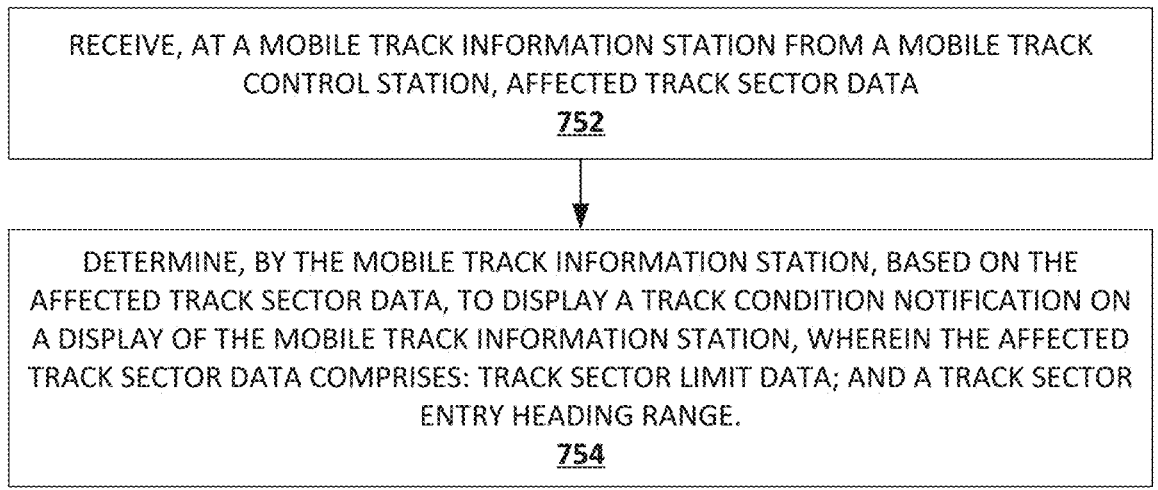
FIG. 7B depicts an example method performed by a track information system, such as depicted and described with respect to FIG. 1.

FIG. 7B depicts an example method performed by a track information system, such as depicted and described above, for example, with respect to FIG. 1. In particular, method 750 depicts a technique for providing track condition information in a track information system.

Method 750 begins at step 752 with receiving, at a mobile track information station from a mobile track control station, affected track sector data. The mobile track information station may be as described above, for example, with respect to FIGS. 3A and 3B. The mobile track information station may be as described above, for example, with respect to FIGS. 2A and 2B. The track sector data may be as described above, for example, with respect to FIG. 5.

Method 750 then proceeds to step 754 with determining, by the mobile track information station, based on the affected track sector data, to display a track condition notification on a display of the mobile track information station. In some implementations, the affected track sector data includes track sector limit data and a track sector entry heading range. Other implementations may further include a track sector exit heading range.

Though not depicted in FIG. 7B, method 750 may further include determining a location of the mobile track information station; and comparing the location of the mobile track information station to the track sector limit data to determine that the mobile track information station is within an affected track sector associated with the affected track sector data, such as described above with respect to FIG. 5.

Method 750 may further include determining that the mobile track information station entered the affected track sector on a heading within the track sector heading entry range based on historical track position data stored in a memory of the mobile track information station, such as described above with respect to FIG. 5.

Method 750 may further include determining an event based on data received from one or more sensors of the mobile track information station, and transmitting an event notification to the mobile track control station, such as described above with respect to FIG. 5.

Method 750 may further include: displaying on the display of the mobile track information station a prompt regarding a user's condition for the user to respond to, such as described above with respect to FIG. 4A.

Notably, method 750 is just one example, and many other methods such as described herein are possible.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing track condition information, comprising:
   receiving, at a first track control station, a track condition notification;
   transmitting, from the first track control station to a second track control station in a network of track control stations, the track condition notification;
   receiving, at the first track control station from a third track control station, affected track sector data regarding an affected track sector; and
   transmitting, from the first track control station to a first mobile track information station within a first vehicle, the affected track sector data,
   wherein:
      the affected track sector data comprises track sector limit data,
      the affected track sector data comprises a track sector entry heading range, and
      the affected track sector data is configured to be used by the first mobile track information station to determine whether the first vehicle is within the affected track sector.

2. The method of claim 1, wherein:
   the first track control station comprises a first radio transceiver configured for data exchange with the network of track control stations, and
   the first track control station comprises a second radio transceiver configured to receive event notification data from a track information station.

3. The method of claim 2, further comprising receiving, at the first track control station from a second mobile track information station within a second vehicle, an event notification.

4. The method of claim 3, wherein the event notification comprises one or more of:
   a car identifier, a class or group identifier,
   a vehicle number,
   a detail regarding an event, and
   a current location of a vehicle in which the second mobile track information station is operating.

5. The method of claim 3, wherein receiving the track condition notification at the first track control station is based on receiving the event notification.

6. The method of claim 2, wherein:
   the network of track control stations comprises a ring network,
   each track control station within the network of track control stations comprises a unique node ID, and
   transmitting the track condition notification to the second track control station is based on a node ID of the second track control station.

7. The method of claim 2, wherein receiving the track condition notification comprises receiving an indication that a first physical button associated with a track condition, of a plurality of pre-configured physical buttons of the first track control station, was pressed.

8. The method of claim 1, further comprising:
   transmitting, to the first mobile track information station, a message addressed to an individual car in which the first mobile track information station is operating,
   wherein the message is configured to cause the first mobile track information station to display an on-screen message on a display based on the message.

9. The method of claim 1, wherein at least one of the first track control station, the second track control station, or the third track control station comprises a mobile device configured to operate on battery power.

10. The method of claim 1, wherein the first track control station comprises:
a display screen, wherein the display screen is configured to display a current track condition based on the track condition notification; and
a plurality of buttons, wherein two or more of the plurality of buttons is associated with a track condition.

11. A track control station, comprising:
a first radio transceiver configured for data exchange with a network of track control stations;
a second radio transceiver configured to receive event notification data from a mobile track information station;
a memory comprising computer-executable instructions;
a processor configured to execute the computer-executable instructions and cause the track control station to:
receive a track condition notification;
transmit, to a second track control station in a network of track control stations, the track condition notification;
receive, from a third track control station, affected track sector data regarding an affected track sector; and
transmit, to a first mobile track information station within a first vehicle, the affected track sector data, wherein:
the affected track sector data comprises track sector limit data,
the affected track sector data comprises a track sector entry heading range, and
the affected track sector data is configured to be used by the first mobile track information station to determine whether the first vehicle is within the affected track sector.

12. The track control station of claim 11, wherein:
the first radio transceiver comprises a first LoRa® radio transceiver,
the second radio transceiver comprises a second LoRa® radio transceiver, and
the first radio transceiver and the second radio transceiver are configured to operate on different frequencies within a frequency band.

13. The track control station of claim 11, wherein the processor is further configured to cause the track control station to receive from a second mobile track information station within a second vehicle, an event notification.

14. The track control station of claim 13, wherein the event notification comprises one or more of:
a car identifier, a class or group identifier,
a vehicle number,
a detail regarding an event, and
a current location of a vehicle in which the second mobile track information station is operating.

15. The track control station of claim 13, wherein the processor is configured to cause the track control station to receive the track condition notification at the track control station based on receiving the event notification.

16. The track control station of claim 11, wherein:
the network of track control stations comprises a ring network,
each track control station within the network of track control stations comprises a unique node ID, and
the processor is configured to cause the track control station to transmit the track condition notification to the second track control station based on a node ID of the second track control station.

17. The track control station of claim 11, wherein in order to receive the track condition notification, the processor is configured to cause the track control station to receive an indication that a first physical button associated with a track condition, of a plurality of pre-configured physical buttons of the track control station, was pressed.

18. The track control station of claim 11, wherein the processor is configured to cause the track control station to:
transmit, to the first mobile track information station, a message addressed to an individual car in which the mobile track information station is operating,
wherein the message is configured to cause the first mobile track information station to display an on-screen message on a display based on the message.

19. The track control station of claim 11, wherein the track control station comprises a mobile device configured to operate on battery power.

20. The track control station of claim 11, wherein the track control station comprises:
a display screen, wherein the display screen is configured to display a current track condition based on the track condition notification; and
a plurality of buttons, wherein two or more of the plurality of buttons is associated with a track condition.

* * * * *